United States Patent
Mandanapu

(10) Patent No.: US 10,244,463 B2
(45) Date of Patent: Mar. 26, 2019

(54) SYSTEM AND METHOD FOR APPLICATION BASED SELECTION OF A RADIO NETWORK

(71) Applicant: Orange, Paris (FR)

(72) Inventor: Subash Mandanapu, Fremont, CA (US)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/106,676

(22) PCT Filed: Dec. 11, 2014

(86) PCT No.: PCT/IB2014/003074
§ 371 (c)(1),
(2) Date: Jun. 20, 2016

(87) PCT Pub. No.: WO2015/092541
PCT Pub. Date: Jun. 25, 2015

(65) Prior Publication Data
US 2017/0034775 A1    Feb. 2, 2017

Related U.S. Application Data

(60) Provisional application No. 61/919,310, filed on Dec. 20, 2013.

(51) Int. Cl.
*H04W 48/18*    (2009.01)
*H04W 4/24*    (2018.01)
(Continued)

(52) U.S. Cl.
CPC ....... *H04W 48/18* (2013.01); *H04M 15/8038* (2013.01); *H04M 15/8083* (2013.01);
(Continued)

(58) Field of Classification Search
CPC .................................................. H04W 48/18
See application file for complete search history.

(56) References Cited

U.S. PATENT DOCUMENTS

| | | | | |
|---|---|---|---|---|
| 2009/0082020 A1* | 3/2009 | Ch'ng | .................. | H04W 48/20 455/435.3 |
| 2013/0065572 A1* | 3/2013 | Brisebois | .............. | H04M 15/00 455/418 |

(Continued)

FOREIGN PATENT DOCUMENTS

| | | |
|---|---|---|
| EP | 2071891 A1 | 6/2009 |
| WO | 2012061771 A1 | 5/2012 |

OTHER PUBLICATIONS

International Search Report and Written Opinion dated Jun. 29, 2015 for corresponding International Application No. PCT/IB2014/003074, filed Dec. 11, 2014.

*Primary Examiner* — Michael T Vu
(74) *Attorney, Agent, or Firm* — David D. Brush; Westman, Champlin & Koehler, P.A.

(57) ABSTRACT

Application-based selection of a network is disclosed. An electronic device provides data connectivity. The device includes: an application, the application being associated to a list of preferred radio networks for exchanging data over the radio networks; a connection manager to detect and connect the device with a radio network for exchanging data over the radio network; an event processor operable to detect the triggering of the application, the connection manager being further configured, when the event detector reports the triggering of the application, to retrieve the list of preferred radio networks associated to the application, connect with a radio network selected from the retrieved list of preferred radio networks, and process a data connectivity request from the application over the registered radio network.

18 Claims, 12 Drawing Sheets

(51) Int. Cl.
*H04M 15/00* (2006.01)
*H04M 17/02* (2006.01)
*H04W 12/08* (2009.01)

(52) U.S. Cl.
CPC ......... *H04M 15/8207* (2013.01); *H04W 4/24* (2013.01); *H04M 15/8044* (2013.01); *H04M 17/02* (2013.01); *H04W 12/08* (2013.01)

(56) References Cited

U.S. PATENT DOCUMENTS

| | | |
|---|---|---|
| 2013/0316703 A1 | 11/2013 | Girard et al. |
| 2013/0329639 A1 | 12/2013 | Wietfeldt et al. |
| 2014/0075025 A1* | 3/2014 | Stanforth .............. H04W 48/14 709/225 |
| 2014/0173700 A1* | 6/2014 | Awan .................... H04L 63/107 726/4 |

* cited by examiner

SYSTEM AND METHOD FOR APPLICATION BASED SELECTION OF A RADIO NETWORK

CROSS-REFERENCE TO RELATED APPLICATIONS

This Application is a Section 371 National Stage Application of International Application No. PCT/IB2014/003074, filed Dec. 11, 2014, the content of which is incorporated herein by reference in its entirety, and published as WO 2015/092541 on Jun. 25, 2015, in English, which claims priority to and the benefit of U.S. Provisional Application No. 61/919,310, filed Dec. 20, 2013, the content of which is incorporated herein by reference in its entirety.

BACKGROUND

Field

The present application relates generally to acquiring access to a data network and more specifically to systems, methods, and devices selecting data network access.

Description of Related Technology

In many telecommunication systems, the operators of a network control which electronic device can access the network as well as the degree of access permitted. The access may be controlled by a subscription. The subscription is generally an agreement between the user of an electronic device, and a network operator. The agreement typically includes payment for access.

As devices become more robust, the content available for display via the devices also increases. The devices may process more data in a faster way to provide enhanced user experiences. For example, electronic devices such as smartphones are capable of downloading high-definition video content via a cellular/LTE/3G connection for display on the smartphone.

While the devices may be consuming more data, the users must account for the increased data obtained via the network. To help curb the overall network impact, some network operators have introduced limited data plans, through e.g. an allowable quantity per month. These limited plans allow a fixed quantity of data access for a device. Should a particular device consume more than the plan amount, the user of such a device is either cutoff from further access or permitted additional access at an extra, perhaps, cost.

Furthermore, some devices are available without a data plan. Such devices may be configured to execute applications such as a video or music player. These devices may attach to a data (or radio) network using a Wi-Fi network, but, due to the lack of a contract, are unable to access the data network via cellular/LTE/3G connections.

To avoid the burden of limited data plans to the users, some network operators and telcos have partnered with third party companies to offer toll-free (e.g., no charge) or discounted connectivity for applications. For example, the companies may offer prepaid applications that would allow a user to access and use an application for a certain amount of time or data, even in a roaming situation. The data connectivity of such an application is then charged to the third party company providing the application.

A problem nevertheless arises when the electronic device is connected to a data or radio network managed by a network operator that has no partnership with the application provider. The user may not be able to benefit from the toll-free or discounted connectivity.

Accordingly, devices, systems, and methods for permitting the full benefit of toll-free application data network access on an application-by-application basis are desirable.

SUMMARY OF CERTAIN INNOVATIVE ASPECTS

In one innovative aspect, there is an electronic device for providing data connectivity. The device comprises an application, the application being associated to a list of preferred radio networks for exchanging data over said radio networks. The device further comprises a connection manager to detect and connect the device with a radio network for exchanging data over said radio network, an event processor operable to detect the triggering of the application, the connection manager being further configured, when the event detector reports the triggering of the application, to retrieve the list of preferred radio networks associated to the application, connect with a radio network selected from the retrieved list of preferred radio networks, process a data connectivity request from the application over the registered radio network.

Thanks to the present device, there is provided an application based network selection. Following the triggering of the application, the device will favor a radio or data network associated to the application. This may be useful if, e.g. network specific billing is available over that network.

In another innovative aspect there is provided a method for providing data connectivity to an application running on an electronic device, the application being associated to a list of preferred radio networks for exchanging data over said radio networks, the method comprising detecting and connecting the device with a radio network for exchanging data over said radio network, detecting the triggering of the application. The method further comprises when the triggering of the application is detected to retrieving the list of preferred radio networks associated to the application, connecting with a radio network selected from the retrieved list of preferred radio networks, processing a data connectivity request from the application over the registered radio network.

In another innovative aspect of the present system, there is also provided a non-transitory computer-readable storage medium comprising instructions executable by a processor of an apparatus, the instructions causing the apparatus to detect and connect the device with a radio network for exchanging data over said radio network, detect the triggering of an application running on the apparatus, the application being associated to a list of preferred radio networks for exchanging data over said radio networks. The instructions further cause the apparatus, when the triggering of the application is reported to retrieve the list of preferred radio networks associated to the application, connect with a radio network selected from the retrieved list of preferred radio networks, process a data connectivity request from the application over the registered radio network.

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include toll-free cross carrier data network access.

DETAILED DESCRIPTION OF CERTAIN ILLUSTRATIVE EMBODIMENTS

Figure 1:
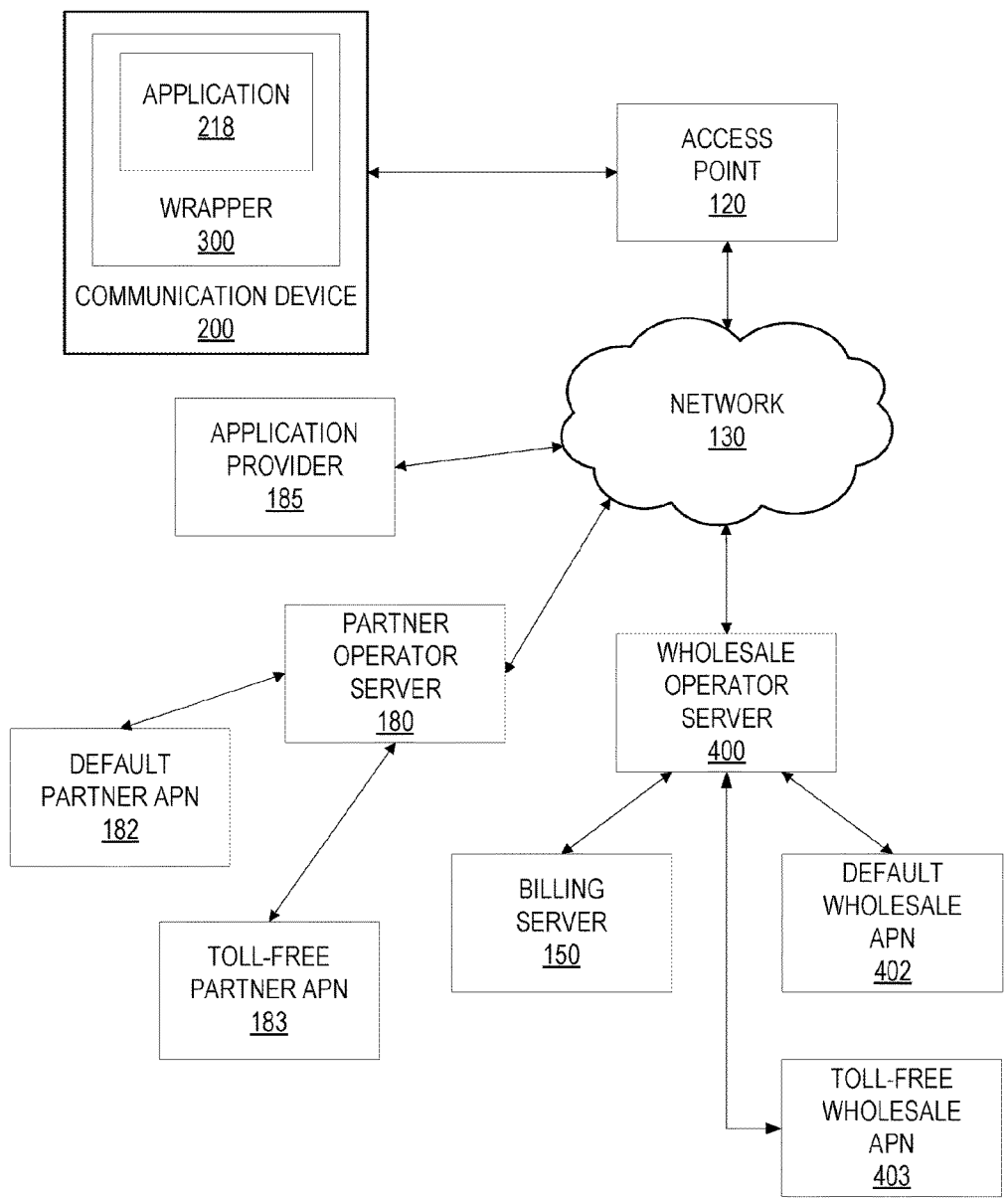
FIG. 1 is a functional block diagram of an example communication network system.

In one aspect, an architecture comprising a first application operable to request data connection to a telecommunication network in a client/server mode is provided. The architecture also includes a wrapper for the first application and operable to detect triggering of the first application (or intercept first request for data from server), send an authorization request to a billing server in the telecommunication network, the authorization comprising an application identifier and an operator identifier for requesting special handling of the first application data connection from the operator, and, upon receipt of an authorization from the billing server, authorizing data connection to the network from the first application.

In a second aspect, an electronic or communication device for providing data connectivity to an application running on the device is provided. The application is associated to a list of preferred radio networks for exchanging data over said radio networks. The electronic device comprises a connection manager to detect and connect the device with a radio network available for exchanging data over said radio network, an event detector operable to detect the triggering of the application. The connection manager is further operable, when the event detector reports the triggering of the application, to retrieve the list of preferred radio networks associated to the application, connect with a radio network based on the retrieved list of preferred radio networks, process a data connectivity request from the application over the connected radio network.

Some network operators may find a benefit in partnering with third party companies, also referred to later on as content or application providers, to offer toll-free (e.g., no charge) or discounted connectivity for applications. By toll-free application, also referred as prepaid application here after, one may understand that the connectivity needed by such an application is paid by a third party company, instead of the regular data plan of the user. For example, the companies may offer prepaid applications that would allow a user to access and use an application for a certain amount of time or data, even in a roaming situation. Such an application could allow for instance access to a content source controlled by a third party company, the actual billing of the access being handled between the network operator and the third party company, transparently to the user.

The systems and methods described herein provide the management of the toll-free connectivity without the need for user interaction. This is achieved in-part via an application wrapper that is associated with a regular application. The wrapper is generally arranged to detect triggering of the application. Once triggered, the wrapper may send a request to the network to identify a specific billing plan for the application. The wrapper may receive authorization from the network and execute the application normally under the specific billing plan for the application. The wrapper may report monitored data usage for the application to the network. Through the use of wrapper, the billing of the application may not be charged to the user or charged at a discounted rate.

In the present system, the application, offered by the application provider, is associated to a list of preferred radio or data networks. The list of application preferred radio networks may correspond to the networks offered by the network operators the application provider has a partnership with.

As one example, consider a content provider like "MegaSports." MegaSports may develop and provide an application which may execute on mobile devices but requires access to a data network to obtain the content. MegaSports may negotiate a global wholesale data access deal with network operator like SuperTelco. The deal may define the data connectivity policy (data or connectivity policy in short), i.e. specify various data access limits for traffic associated with the wrapped application. Examples of these limits may include one or more of a maximum data limit, per data unit (e.g., byte, megabyte, gigabyte) price, and geographic coverage, service level agreements (SLAs) on mobile, fixed, per user limits, etc. SuperTelco may provide an API/wrapper to MegaSports' application. MegaSports can distribute the wrapped application through multiple distribution channels including application stores, SIM cards, hardware attachment (e.g., earphones, sensor, etc.), and the like. When a customer, i.e. a subscriber, of SuperTelco tries to use the MegaSports application on his electronic device, SuperTelco may identify the application traffic to/from the user electronic device as related to MegaSports and manage the session until the negotiated quota expires. This may include refraining from billing the user for application traffic for the MegaSports application. Using this example, the list of preferred networks for MegaSports comprises the SuperTelco data network, the home network to the electronic device.

Still using the example of the electronic device connected to its home network SuperTelco, say the application provider of MegaSports has not partnered with SuperTelco, but with OtherTelco. The wrapper, upon detection of the triggering of the MegaSport application, will retrieve the MegaSports list of preferred networks. As the list does not comprise the current network the electronic device is connected with, the wrapper will trigger a scan of available networks, and will connect with OtherTelco if available. The data connectivity requests and sessions for the MegaSports application will be managed through the MegaSports partner network OtherTelco.

Say now the deal also includes SuperTelco, and a MegaSport partner network, such as OtherTelco1. The MegaSports list of preferred networks will also comprise the OtherTelco1 data network. When roaming outside its home network, the electronic device will first connect to a SuperTelco partner network. A network operator generally partners with different other network operators to allow communications services even in roaming situation. A list of operator or device preferred networks is stored with the electronic device. The electronic device, when roaming, will attach to a radio network based on that list of operator preferred networks. When the subscriber of SuperTelco is accessing (with his electronic device comprising the wrapped MegaSports application) an operator partner network, such as OtherTelco2, the wrapper, after detecting the triggering of the MegaSports application, will retrieve the MegaSports list of preferred networks. Provided OtherTelco2 is the same network as OtherTelco1, the wrapped application will not change the network connection Provided OtherTelco2 is different than OtherTelco1, the wrapper will trigger a scan of available networks, and provided OtherTelco1 is available, will connect with it. In both instances, the data connectivity requests and sessions for the MegaSports application may be managed through the MegaSports partner network OtherTelco1. To that effect, the application data connectivity requests will be routed to SuperTelco to validate access (e.g., via APIs). Once validated SuperTelco can provide OtherTelco1 with SLAs and per user quota limits. OtherTelco1 may manage the end user session including allowing traffic to and from the MegaSports application based on the provided information. Upon completion of a user session or another designated time, OtherTelco1 may send a clearance request to SuperTelco. The clearance request may include the amount owed to OtherTelco1 for allowing the application traffic for the MegaSports application. SuperTelco may then settle the charges to OtherTelco1.

One non-limiting advantage of the described aspects is the ability to provide a data rich application in way that does not require the user to pay for accessing. The bargain of receiving the user's usage data in exchange for free data access subsidized by the application provider may be an attractive bargain.

A further non-limiting advantage of the described aspects is the transparency to the user and the application provider. In part because the application wrapper forms a contain within which the application can execute, the functions of the application may be monitored and enhanced to provide the toll-free experience without the need for further user or application provider configurations.

Another non-limiting advantage of the described aspects is the application can select a network controlled by a network operator which has negotiated the wrapped application with the application provider. That may be the access to a network controlled by a wholesale network operator who has negotiated the wrapped application with the application provider. That may be the access to a network controlled by a partner network operator (e.g., roaming). In such implementations, the partner may allow the application toll-free access and instead of charging the user, the partner can reconcile the cost of the access with the wholesale operator. Furthermore, devices without a traditional cellular data plan may use aspects described to use a data rich application.

Another non-limiting advantage of the described aspects is the control of network access in roaming situations. Some users prefer to turn off any data connectivity when in roaming situations. If opening data connectivity for a given application, applications running in the background may use that open connection to exchange data with the network, thereby increasing the roaming charges to a user. Thanks to the present system, the wrapped application may be associated for each network of the list of application preferred networks to an access point name (APN) dedicated to the toll-free applications. Upon identifying a roaming situation, the wrapper will cause the electronic device to connect to one of the preferred network, using the dedicated APN instead of the default APN normally associated to the chosen network.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different data access technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a functional block diagram of an example communication network system. The system 100 includes a communication device 200. The communication device 200 may be an electronic device such as a mobile phone, a smart phone, a tablet computer, a personal computer, a game console, a set-top box, or other communication device configured to transmit/receive data.

The communication device 200 may include an application 218. An application may generally refer to an installed capability for the communication device 200. More generally, the expressions application or application program (AP) in the present description may be taken in a very general sense, and may be seen as any tool that functions and is operated by means of a computer, with the purpose of performing one or more functions or tasks for a user or another application program. To interact with and control an AP, a graphical user interface (GUI) of the AP may be displayed on the display of the electronic device. Example applications include a web browser, a movie viewer, a music player, a newsreader, a document editor, or other functional additions to the communication device 200. The application 218 may be installed on the communication device 200 by the manufacturer, a network operator providing service for the device, and/or a user of the communication device 200. The application 218 may be installed once hardware is attached to the communication device 200. For example, attaching a sensor to the communication device 200 may cause the execution/installation of the application 218. The installation may be performed at the time of manufacture, via over the air provisioning, via storage coupled to the communication device 200 such as a SIM card, or other suitable installation means.

The application 218 may be wrapped by a wrapper 300. The wrapper 300 may be considered a container for the application 218. The application 218 may be executable without a wrapper, but the wrapper 300 may provide additional functionality for the application 218 without requiring the application developer to know the details of the wrapper 300 interface. For example, an application developer may generate a new interactive game. Standing alone, the application may request network access for playing the game. In a wrapped mode, the application may request network access via the wrapper 300 for playing the game. The wrapper 300 may intercept the network access request and perform additional processing related thereto as will be described in further detail below.

The communication device 200 may be configured to access a data or radio network 130 via an access point 120. The access point 120 may be a Wi-Fi access point, a cellular access point, an LTE or other 3G access point, a radio access point, a wired access point (e.g., Ethernet), or other network portal. Accordingly, the network 130 may be a packet switched network, a public network, a wide-area network, a private area network, a mesh network, a cellular network, a radio network, a local area network, or other such communication network configured to transmit and receive data between devices.

The access point 120 may be configured to permit certain communication devices access to the network 130. The access point 120 may perform authorization for the communication device before allowing access to the network 130. The communication device 200 may provide information to the access point 120 which may be used to determine whether or not to allow the communication device 200 to access the network 130. The access point 120 is generally associated with a service provider. The service provider is the entity which determines who may access the network 130. For example, a telecommunications company may construct a radio tower access point to allow customers with a valid subscription to access a network. In such cases, the telecommunications company may wish to limit or otherwise control who can access the network.

FIG. 1 shows a wholesale operator server 400 in data communication with the network 130. The wholesale operator server 400 is configured to provide access on a wholesale basis. The wholesale operator server 400 may receive information regarding communication devices and/or applications which are allocated an amount of network access. Accordingly, when an application requests access via the access point 120, the access point 120 may inquire with the wholesale operator server 400 as to whether the application and/or communication device is authorized for wholesale access. In the event the application and or communication device is not authorized, the access point 120 may fall back on a standard subscription determination for the communication device 200. For example, a determination as to whether the communication device 200 has a valid subscription may be performed.

The wholesale operator server 400 is in further communication with a billing server 150. The billing server 150 is configured to receive information regarding access for the wholesale operator server 400. Where the access point 120 is operated by an entity other than the wholesale operator, the operator of the network access point may request compensation for allowing the communication device 200 and/or the application 112 to access the network. The billing server 150 may be configured to facilitate this reimbursement by reconciling the usage authorized by the wholesale operator server 400 with the operator of the network access point. In some implementations, the billing server 150 may be configured to generate a billing request to a third-party such as the application developer. The billing request may indicate an amount requested. In some implementations, the billing server 150 may be configured to generate a billing request to an account associated with the communication device 200.

FIG. 1 also includes a partner operator server 180. The partner operator server 180 generally refers to an operator who does not have a negotiated data connectivity policy for the wrapped application. The partner may provide toll-free access to the wrapped application through an agreement (e.g., charge-back agreement) with the wholesale operator. This agreement and subsequent authorization may be achieved through messages transmitted from the partner operator server 180 and the wholesale operator server 400 via the network 130. The authorization messaging will be described in further detail below.

In some embodiments, the network 130 may be a GPRS, 3G, 4G or LTE mobile network, either operated by a wholesale network operator (which then manages the wholesale server 400 and the access point 120) or a partner network operator (which then manages the partner network server 180 and the access point 120). Network 130 may further comprise a default access point name (APN) gateway between the mobile network and another data network, e.g. the public Internet. When a mobile device attached to mobile network 130 makes a data connection to access the Internet, it must be configured with an APN to present to the mobile network 130. The operator (presently either the wholesale or parent network operator) of the mobile network will then examine the APN to determine what type of network connection should be created. FIG. 1 presents the default wholesale APN server 402 corresponding to the wholesale network operator and the default parent APN server 183 corresponding to the partner network operator. In the present system, an alternative APN is available for each network operator. This alternative APN (respectively the toll-free wholesale APN server 403 and the toll-free partner APN server 183 in FIG. 1) may be used in roaming situation to control the data traffic to and from the mobile device making connection to the Internet, as explained here after.

The system 100 shown further includes an application provider 185. The application provider 185 is an entity that provides the application which will be wrapped. The application provider 185 may be coupled with the network 130. The application may be provided via the network 130 such as through an Internet download or an application store. In some implementations, the application provider 185 may provide the application to the wholesale operator server 400 for wrapping and/or distribution. In the present system, the prepaid application is associated with a data connectivity policy resulting from the global wholesale data access agreement between the application provider 185 and the wholesale network operator. FIG. 1 shows an optional communication path directly from the application provider 185 to the wholesale operator server 400. Such a direct communication path may be used to provide the application to the wholesale operator for wrapping and/or establish the connectivity policy.

Figure 2:
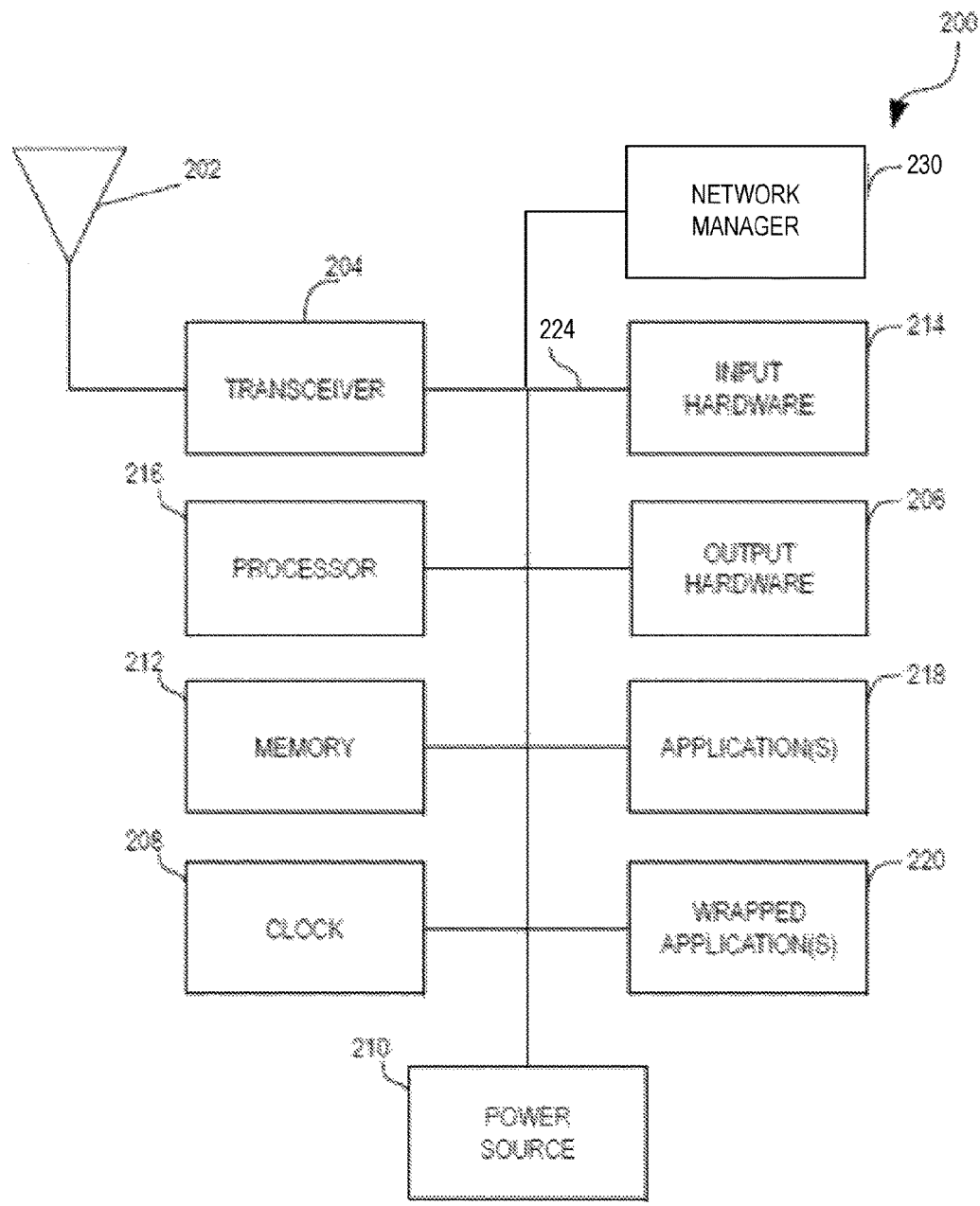
FIG. 2 is a functional block diagram of an example of a communication device.

FIG. 2 is a functional block diagram of an example of a communication device. When implemented as a device hosting a wrapped application, the communication device 200 may include circuitry for performing the main functions of a mobile phone, such as a mobile smart-phone, a tablet computer, a laptop computer, gaming console, set-top-box, personal computer, or the like.

The communication device 200 may include one or more antennas 202 and a transceiver unit 204 for the transmission and reception of wireless signals (including the present data connectivity requests and data activities of the communication device 200); output hardware 206 such as an audio unit, a microphone, and/or a display screen; a clock 208; a power source 210 (e.g., battery, solar panel, wired power connection); a memory 212, input hardware 214 such as a keypad or touchscreen for receiving a user input, a GPS unit for indicating the geographical location of the device, a wired network connection (e.g., Ethernet port); and a processor 216. Some output hardware 212 such as a display screen may include a touch sensitive screen. Accordingly, some output hardware 212 may provide input functionality and some input hardware 214 may provide output functionality. The memory 212 may include one or more memory circuits including non-volatile memory circuits (e.g., EEPROM, FLASH, etc.).

Depending on the capabilities of the communication device 200 and the supporting telecommunication networks the communication device 200 can also provide a range of voice and data communication services. As non-limiting examples the communication device 200 provides telephone network based communication services including voice, multimedia and text messaging, as well as other data exchange capabilities, enabling Internet access, data activities from an application and email exchange, for example.

The communication device 200 may be configured to exchange data via a 3G, LTE or GPRS network with remote servers such as a wholesale operator server and/or an application provider, and to enable data exchange enabling Internet access (e.g., data network), using for instance the default APN for the radio network the device is attached to. The communication device 200 is operable to have applications or widgets installed, such as, but not limited to social networking applications or email applications, for example, which when executed may exchange data with the remote servers. Each application or widget installed on the communication device 200 may have an associated graphical user interface.

The communication device 200 may also include one or more applications 218. The communication device 200 may further include one or more wrapped applications 220. A wrapped application 220 is distinguishable from an application in that communications to/from the wrapped application 220 are exchanged via an application wrapper 300.

The communication device may also include a network manager for scanning available networks using the one or more antennas 202. The processor 216 of the communication device 200 will then attach or connect to one of the available networks based on the list of operator preferred networks, using the antenna(s) 202 and the transceiver unit 204. Processor 216 is generally operable to change networks attachment based on different triggering conditions.

Figure 3:
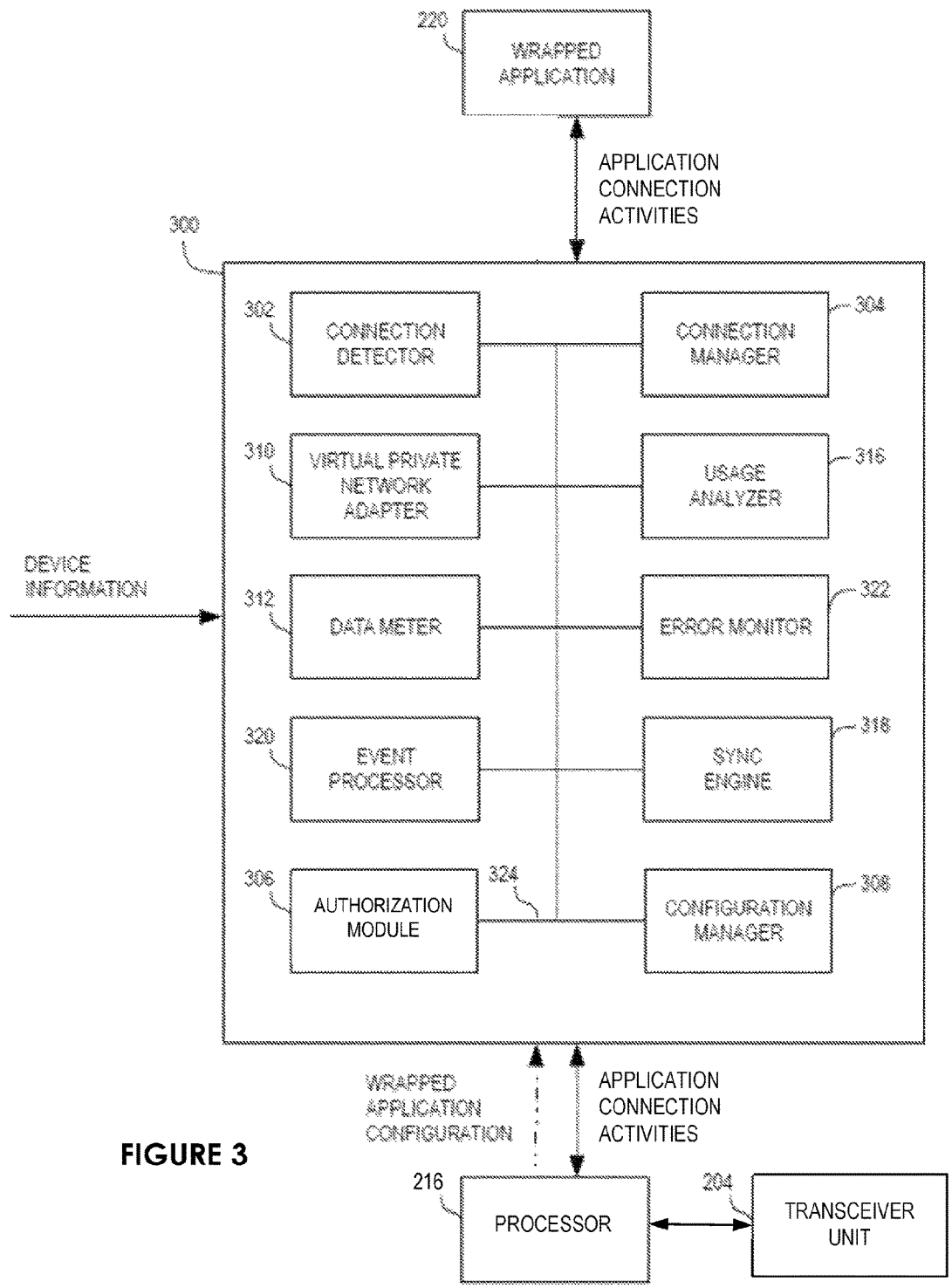
FIG. 3 is a functional block diagram of an example of an application wrapper.

FIG. 3 is a functional block diagram of an example of an application wrapper. The application wrapper 300 includes a connection detector 302. The connection detector is configured to detect connection activity for the wrapped application 220. Connection activity may include a request for a data connection, a request to transmit information via a connection, termination of a connection, reset of a connection, or other data communication connection activities.

The connection detector 302 may be configured to detect connection activity based on the application communications received from the wrapped application 220. The connection detector 302 may be configured to generate a message identifying the connection activity and transmit this information via a bus 324.

A connection manager 304 may obtain the message identifying the connection activity. If the message identifies a request for a new data connection, the connection manager 304 may cause the initiation of the connection. Once a connection is established, the connection manager 304 may be configured to maintain the connection on behalf of the wrapped application 220.

As part of establishing a connection, the connection manager 304 may be configured to establish a toll-free connection. The connection manager 304 may transmit an authentication request via an authentication transceiver 306. The authentication request may be transmitted to a wholesale operator server. The authentication request includes an identifier for the application and the wholesale operator associated with the application. The authentication transceiver 306 may receive the authentication response. The authentication response may include an authentication token for a wholesale data connection. The token may be used for subsequent communications to or from the application to indicate the authorization status for the connection. The authentication response may also include a data connectivity policy including one or more of a data transmission amount, a receive data amount, a data connection duration, and a policy expiration time.

The authentication response may indicate a wholesale connection is not available. In such situations, the connection manager may attempt to establish a connection based on subscription information for the device.

A configuration manager 308 may be included in the wrapper 300. The configuration manager 308 may include one or more parameters for the wrapper 300 and/or the wrapped application 220. For example, the configuration manager 308 may receive wrapped application configuration information via the transceiver 204. The wrapped application configuration information may identify a network address for the wholesale operator server, information to be included in the authorization request, information regarding the data connectivity policy, applying copy protections for the application or associated data stored for the application, enabling/disabling device features during application execution (e.g., screen shot, camera, microphone), or other parameter(s) to adjust the function of the wrapper 300 and/or the wrapped application 220.

The wrapped application configuration information may also comprise a list of preferred radio networks for the application 218. When the radio network is a 3G, 4G, LTE or GPRS mobile network, the configuration information may comprise for each network of the list a default APN (and its address) and possibly a toll-free APN (and its address) for filtering the data activity from the communication device in roaming situation. As explained later, the second APN may be used in situation of roaming, in place of the default APN, to attach to the mobile network if selected. Indeed it may be interesting to use this second APN when the application is prepaid, i.e. tagged with operator specific billing conditions, as known through the application configuration information.

One non-limiting advantage of the configuration manager 308 is the ability to remotely adjust the wrapper 300 and/or the wrapped application 220. Such control may be useful for providing bug fixes, disabling rogue devices/applications, or dynamically adjusting operational aspects, like the data policy connectivity, of the wrapped application 220 without requiring a reinstallation or affirmative action on behalf of a user of the device. For instance, the list of preferred networks for the application may be updated whenever agreements change or mobile networks are added or removed from that list. The data connectivity policy may also be updated if the agreement between the application provider and the wholesale network operator changes.

The wrapper 300 may also include a virtual private network adapter 310. The virtual private network adapter 310 may be included to provide secure communication between the wrapped application 220 and the network 130. Upon establishing a connection, the virtual private network adapter 310 may be used for application communications. The virtual private network adapter 310 may be used only for authentication. In some implementations, it may be desirable to use the virtual private network adapter 310 for application data communications as well. For example, if the application is a banking application, the application developer may determine that certain transactions utilize the virtual private network adapter 310.

As information flows through the established connection, a data meter 312 is configured to monitor information for the authorized data connection. Information which may be collected includes a data transmission amount, a data received amount, a data connection duration, a destination of data transmitted, a source of data received, one or more data request messages, one or more data response messages, and a time at which the authorized data connection was established. The data meter 312 may also time stamp each element of information to identify when the metered value was collected.

A usage analyzer 316 may be configured to process the information collected by the data meter 312. Such processing may include calculating usage information for an authorized data connection. The usage analyzer 316 may also be configured to compare the usage information with the data connectivity policy. For example if the number of bytes of data for the wrapped application 220 exceeds a quantity specified in the data connectivity policy, the usage analyzer may generate a message indicating the policy amounts have been exceeded. The usage analyzer 316 may be further configured to collect application specific analytics such as the time spent on given location within the application, buttons pressed, application performance, and the like. In some implementations, the application configuration may specify the aspects to analyze.

This message may be received by an event processor 320. The event processor 320 may be configured to instruct the wrapper 300 and/or the wrapped application 220 to take one or more actions based on the received event. Events may include usage events, such as exceeding the authorized data connectivity policy. Events may include device events such as powering down, low battery, incoming phone call, termination of a phone call, initialization of an application, termination of an application, device locking, device unlocking, roaming situations and the like. Events may also include application events such as triggering of the application or its termination, if the application is running in the foreground or in the background . . . . An example of an action may be for the connection manager 304 to terminate a connection upon detection of exceeding the authorized data connectivity policy. Another example of action, as explained here after, may be for the connection manager 304 to change network attachment, after the triggering of the application is reported by the event processor 320. In some implementations, the event processor 320 may be configured to transmit event information to a third-party. For example, a wrapped application to keep track of where a child's smartphone is located may detect movement into an area of interest (e.g., into a 'restricted' area, at a specific time, etc.). This event may cause the transmission of a text message or email message to another device (e.g., the parent's smartphone) in addition to transmitting application data to the application provider. In the case of an email message, because the wrapped application may provide toll-free access, the application may receive data connectivity to send this potentially life-saving message.

Another example of an action may be to transmit a report of the usage analyzer 316. A sync engine 318 may be configured to provide such an update of usage information for the wrapped application 220. The sync engine 318 may obtain the usage information from the usage analyzer 316, prepare the information for transmission, and send the usage transmission. The sync engine 318 may be configured to transmit such usage information based on an event, and or the periodic schedule. For example, the sync engine 318 may be configured to transmit a report of usage every five minutes. The usage report may include the authorization token, an application identifier, an operator identifier, and a device identifier.

An error monitor 322 is included to detect errors raised by the application and or the wrapper 300. The error monitor 322 may generate an error report. This error report may be transmitted to the wholesale server operator via the sync engine 318. The error report may include the authorization token, an application identifier, and operator identifier, a device identifier, and information related to the error raised.

The wrapper 300 shown in FIG. 3 receives device information. The device information may include one of power or network bandwidth available to the device, a location identifier indicating a geospatial location of the device, a device identifier uniquely identifying the device, and a user identifier. Examples of device information include a device operating system identifier, an operating system version, and device events and/or errors. The device information is made available to the elements of the wrapper 300 for further processing. For example, the sync engine 318 may be configured to defer transmitting usage reports when device resources are limited (e.g., low bandwidth, low power).

The bus 324 may couple the above described elements for the wrapper 300. The bus 324 may be a data bus, communication bus, or other bus mechanism to enable the various components of the wrapper 300 to exchange information. Bus 324 may further enable the communication via the processor 216 of the communication device 200 to the transceiver unit 204.

In the present system, the connection manager 304 may be further arranged, after the event processor 320 reports a triggering of the wrapped application 220, to retrieve from the configuration manager 308 the list of application preferred networks. The connection manager may first scan for available networks using the network manager 230 of the communication device 200. The connection manager 304 will then instruct the network manager 230 to select and connect to an available network based on the retrieved list of preferred networks. When the selected network is a mobile network, the connection manager 304 may be further arranged to instruct the network manager 230 to connect to the selected mobile network using the corresponding default APN in the configuration information managed by the configuration manager 308. Provided a roaming situation is reported by the event processor 320, the connection manager 304 will instruct the network manager 230 to connect to the selected mobile network using the alternative APN for that network in the configuration information in place of the default APN.

It will further be appreciated that while different elements have been shown, multiple elements may be combined into a single element, such as the data meter 312 and the event processor 320.

Figure 4:
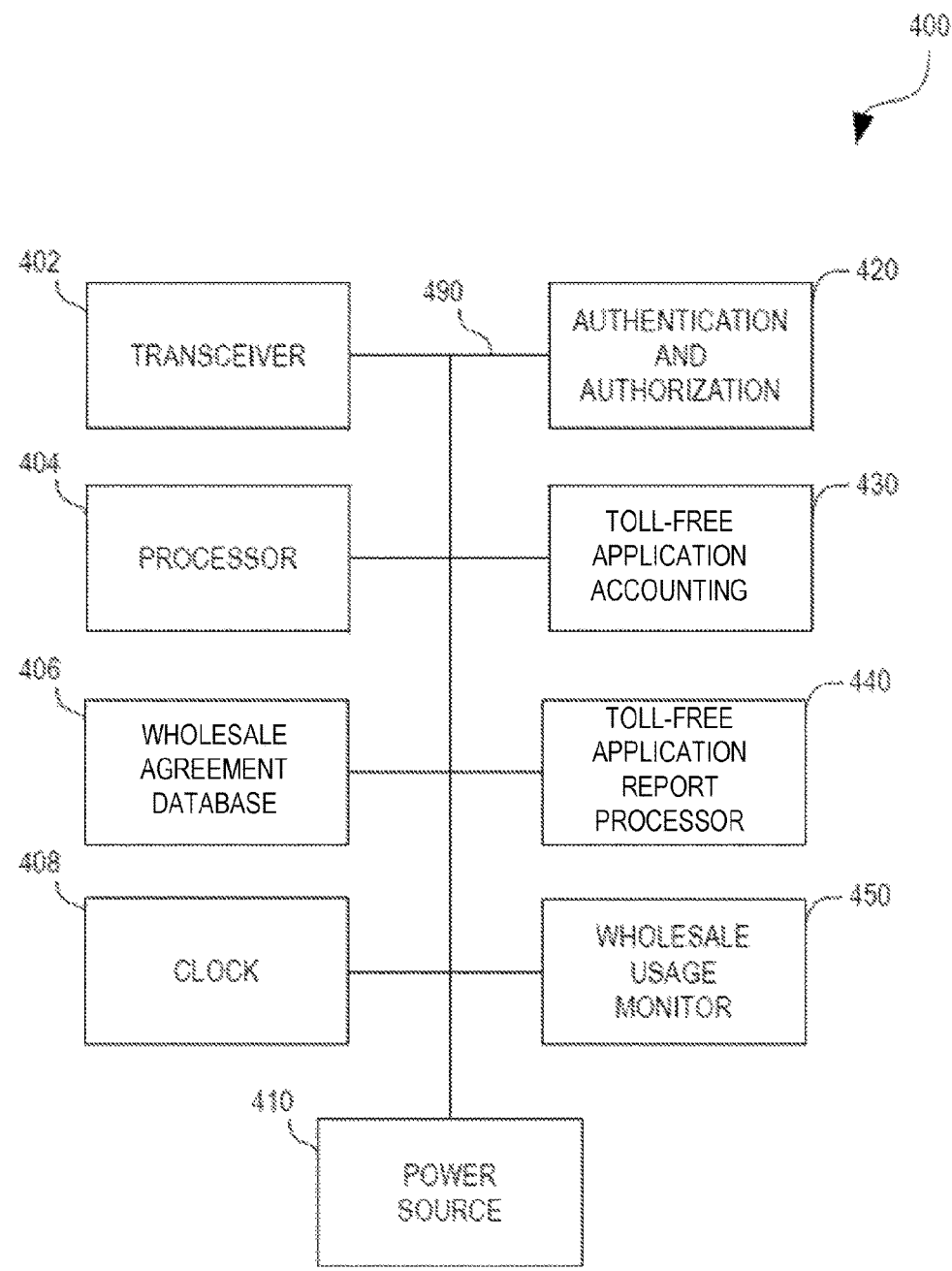
FIG. 4 is a functional block diagram of an example wholesale server.

FIG. 4 is a functional block diagram of an example wholesale server. The wholesale server 400 is configured to manage the provisioning of wholesale data access (e.g., toll-free or subsidized access) for wrapped applications. The management includes receiving applications for wrapped distributions, receiving configuration for the application data policy, providing the authentication and application data policy, and, when the application is made available through partner operator networks, providing an authorization interface and reconciliation interface for the partner operators.

The wholesale server 400 may include one or more antennas (not shown) and a transceiver 402 for the transmission and reception of wireless signals; a processor 404; a memory 406; a clock 408; and a power source 410 (e.g., battery, solar panel, wired power connection). In some implementations, the wholesale server 400 includes a wired network connection (e.g., Ethernet port, fiber optic data port).

The wholesale server 400 includes an authentication and authorization circuit 420. The authentication and authorization circuit 420 is configured to receive wholesale authorization requests and generate an appropriate response. The authentication and authorization circuit 420 may be configured to parse the authorization request to identify the information upon which the authorization determination will be made. The authentication and authorization circuit 420 may then compare the information included in the authorization request with information included in the memory or wholesale agreement database 406. For example, if the authorization request includes an application identifier, the authentication and authorization circuit 420 may look up a data connectivity policy associated with the application identifier in the database 406. This information may then be included in the authorization response. The whole sale agreement database 406 may be updated each time a deal, i.e. a wholesale agreement, is reached between a third party company (the application provider 185) providing the application 218 and the wholesale network operator. Information available on database 406 may comprise an entry for each new deal, each entry comprising e.g. the related data connectivity policy, the corresponding wrapped application configuration information comprising the list of application preferred networks . . .

The authentication and authorization circuit 420 maybe further configured to generate an authentication token to indicate the authorization determination. The authorization token may be generated only when the request is authorized. In some implementations, the token may be generated for all requests (e.g., authorized or unauthorized).

The wholesale server 400 shown in FIG. 4 includes a wrapped application accounting circuit 430. The wrapped application accounting circuit 430 is configured to reconcile usage for the wrapped applications. For example, the application accounting circuit 430 may be configured to periodically (e.g., daily, weekly, hourly, monthly) communicate with the billing server. The application accounting circuit 430 may transmit indicators to exclude the toll-free application data usage from individual subscriber's bills. The application accounting circuit 430 may be further configured to reconcile usage fees associated to the wrapped application incurred via partner operators. In this situation, the application accounting circuit 430 may receive a request for wrapped application data provided via the partner operator and generate a response. The response may include an automatic clearing transaction identifier associated with a funds transfer to the partner operator. The response may include additional status information such as disputed amounts, discrepancy amounts, and the like. The application and accounting circuit 430 may further generate billing information for the application provider. For example, if the application provider has agreed to pay a fixed amount per wrapped application deployed, the application and accounting circuit 430 may collect this information, such as from the memory or wholesale agreement database 406, and generate an appropriate billing request (e.g., via the billing server) for transmission to the application provider.

The wholesale server 400 shown in FIG. 4 includes a wrapped application report processor 440. The wrapped application report processor 440 is configured to generate reports illustrating aspects of the wrapped application. The reports may be summary reports such as total number of users or total quantity of data utilized. The reports may include aggregations such as by date/time, by device type, by user, by device, by location, by network used for data access, by application version number, and the like.

The wrapped application report processor 440 reports may be based on the information collected by a wholesale usage monitor 450. The wholesale usage monitor 450 is configured to receive the usage information from a wrapped application. The wholesale usage monitor 450 may store the received information in the memory 406.

When an application requires data connectivity, several scenarios may arise. In one scenario, the application provider has negotiated data access with a wholesale operator who is also the operator of the network the device executing the application is attached. In this scenario, the network operator has direct access to the wholesale operator server. In a second scenario, the application provider has negotiated data access with the wholesale operator. However the application/device may be attached to a network operated by another network operator. In some implementations, this may be referred to as roaming. In this second scenario, the application may be considered roaming when attempting to access a data network through a connection operated by someone other than the wholesale operator. The message flow diagrams below provide example message flows for establishing a connection and communicating application data in the example scenarios discussed above.

Figure 5:
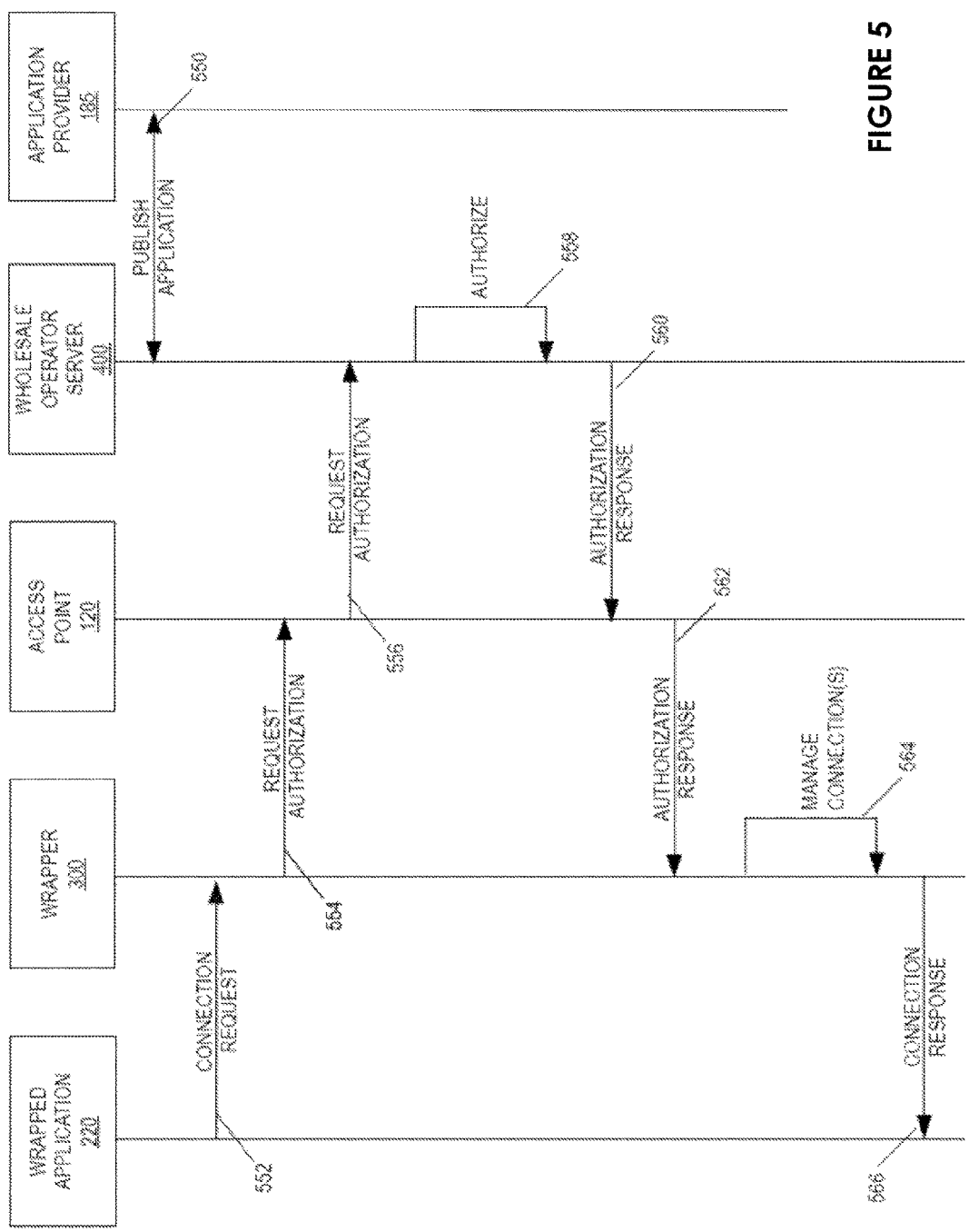
FIG. 5 is a message diagram for obtaining a wholesale data connection.

FIG. 5 is a message diagram for obtaining a wholesale data connection. The message flow of FIG. 5 shows messages exchanged between several entities which may be included in a communication system. For ease of explanation, the number of entities shown has been limited. However, it will be understood that additional entities may be added or multiple entities combined consistent with the description herein. The message flow of FIG. 5 illustrates obtaining a wholesale data connection via a network which is controlled by the wholesale operator.

Messaging 550 between the application provider 185 and the wholesale operator server 400 may be performed to publish the application. In one implementation, the application provider 185 may generate a binary application. The application may then be uploaded to the wholesale operator server 400 such as via HTTP, HTTPS, FTP, or other communication protocol. Upon publishing the application, the wholesale operator server 400 may apply a wrapper to the binary provided by the application provider 185. The publication may be to an application store, a website, or other distribution location/mechanism.

As part of the messaging 550, the application provider 185 may also specify a wholesale agreement with the wholesale operator server 400. For example a news application provider may negotiate 10 MB of use per user per day for an application to be provided by the wholesale operator server 400.

The wrapped application 220 may transmit a connection request to the wrapper 300 via message 552. The wrapper 300 may transmit a message 554 via the access point 120 requesting authorization for wholesale access for the wrapped application 220. The authorization request may include an application identifier and an identifier for the wholesale operator. In some implementations the authorization request may include additional information such as a device identifier, a location identifier, or a user identifier indicative of a user of the application.

The access point 120 may identify the authorization request as a wholesale authorization request. The identification may be based on the application identifier and/or the identifier for the wholesale operator. In some implementations, the authorization request message may be of a distinguishable type. In such implementations, the message type may indicate the destination of the authorization request. The access point 120 may be configured to allow such traffic to pass through to the wholesale operator server 400. In some implementations, the access point 120 may track such requests and include the bandwidth used for further reimbursement from the wholesale operator.

The access point 120 may transmit a message 556 to the wholesale operator server 400 including the authorization request. The wholesale operator server 400 via message 558 may perform an authorization. The authorization may be based on the information included in the authorization request. For example, if the application is executed on a device located within a retail location, wholesale access may be granted free of charge to the device. However if the device travels outside the retail location, limited wholesale access may be granted. The limit may be based on quantity of data, time of day, proximity to the retail location, or other factor.

A message 560 sent from the wholesale operator server 400 to the access point 120 includes the authorization response. The authorization response includes an authorization token. The authorization token may be used to identify the authorization determination for the authorization request, as discussed above. The authorization response may also include a data connectivity policy as discussed above.

The access point 120 may transmit the authorization response via message 562 to the wrapper 300. Based on the authorization response, the wrapper 300 via message 564 may manage the connections. Managing the connections may include establishing the connection, closing the connection, resetting a connection, or the like. In some implementations, the connection manager 304 may be configured to manage the connections. Message 566 is transmitted from the wrapper 300 to the wrapped application 220 indicating the connection response. If authorized, the connection response may include an indication that a wholesale data connection has been established.

Having established a wholesale data connection, the wrapped application 220 may begin using the connection to send and receive data.

Figure 6:
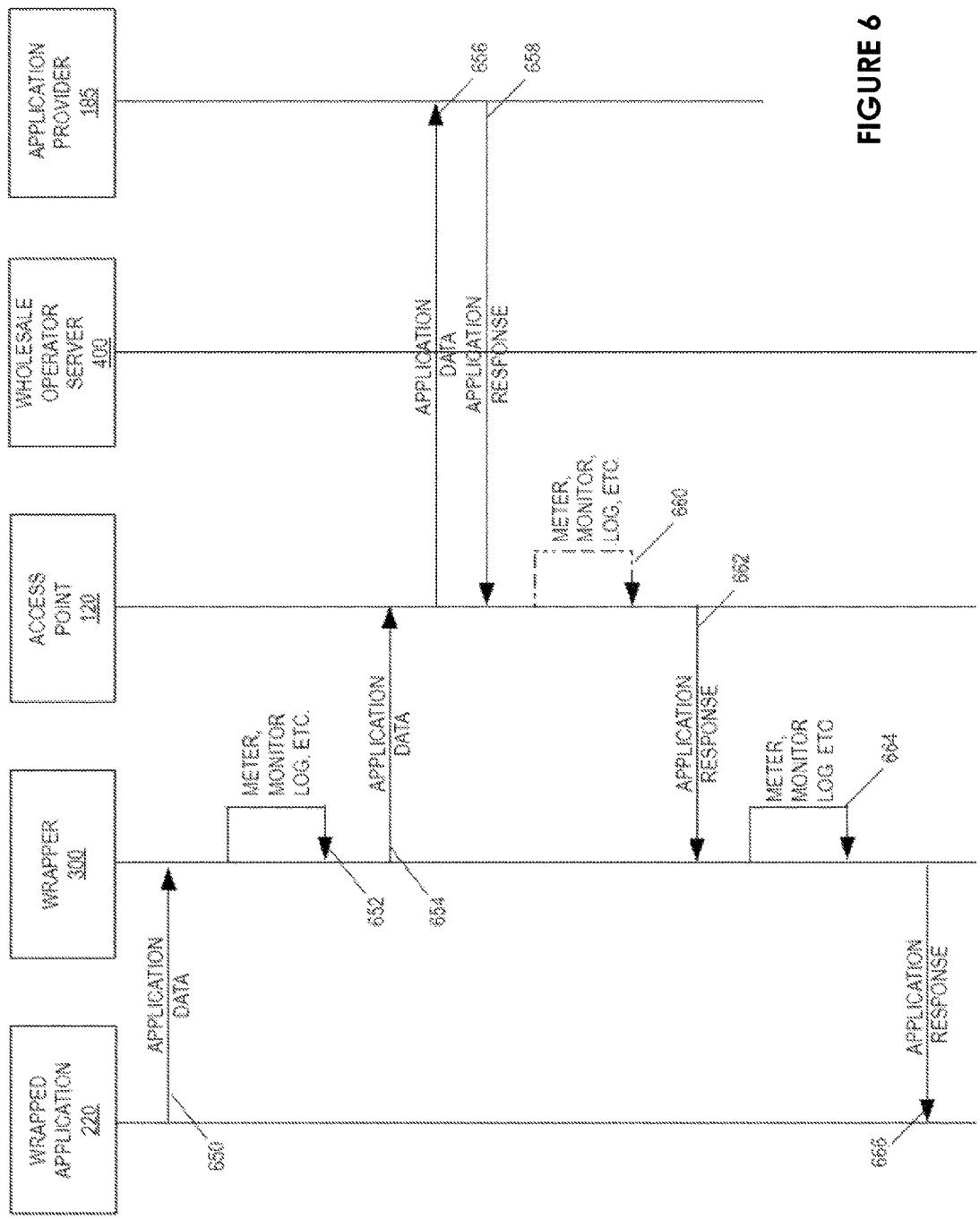
FIG. 6 is a message diagram for communicating data via a wholesale data connection.

FIG. 6 is a message diagram for communicating data via a wholesale data connection. The message flow of FIG. 6 shows messages exchanged between several entities which may be included in a communication system. For ease of explanation, the number of entities shown has been limited. However, it will be understood that additional entities may be added or multiple entities combined consistent with the description herein. The message flow of FIG. 6 illustrates application communication via a wholesale data connection through a network which is controlled by the wholesale operator.

A message 650 may include application data. The message 650 may be transmitted from the wrapped application 220 to the wrapper 300.

The wrapper 300 via message 652 may monitor, meter, log, or otherwise process the application data. Presuming the application data does not violate the data connection policy, message 654 is transmitted from the wrapper 300 to the access point 120 including the application data. The access point 120 may transmit the application data directly to the application provider 185 via message 656. In some implementations, the application data may be transmitted to another service provider (not shown). For example, the application may access content (e.g., multimedia, images, text) hosted by a third-party.

Message 658 includes an application response. The application response shown in FIG. 6 is transmitted from the application provider 185 to the access point 120.

Some access points may be aware that the connection is a wholesale data connection. For example if the access point 120 is maintained by the wholesale operator, the access point 120 may optionally meter, monitor, log, or otherwise process the application response. This is shown in FIG. 6 as optional message 660. Such messaging may be useful to further exercise data connectivity policy control. Consider the situation where an application is allocated 100 MB of data. In an extreme case, where an application response exceeds 100 MB of data, the access point 120 may be configured to terminate the connection. In a less extreme case, it may be determined that an average response for the application is 5 MB. If a response is received for a connection which has already logged 97 MB of usage, the access point 120 may be configured to terminate the connection.

Assuming the access point 120 is not exercising control or otherwise terminating the connection, the application response is transmitted via a message 662 from the access point 120 to the wrapper 300. The wrapper 300 at message 664 will again meter, monitor, log, or otherwise process the application response data. This may include counting the number of bytes received, identifying the content received, logging any errors obtained, and the like.

If the wrapper 300 determines the authorized data policy has not been exceeded, message 666 includes the application response and is transmitted from the wrapper 300 to the wrapped application 220. In the event the data policy has been exceeded, the wrapper 300 may be configured to transmit a message indicating such a state to the application. In this case, the wrapper 300 may also terminate the connection.

Not shown in FIG. 6 is the periodic reporting of the usage data to the wholesale operator server 400. The report may include an identification of the application, data monitored or logged, errors, wrapped application configuration (e.g., settings, version number), or other information related to the wrapped application 220.

Figure 7:
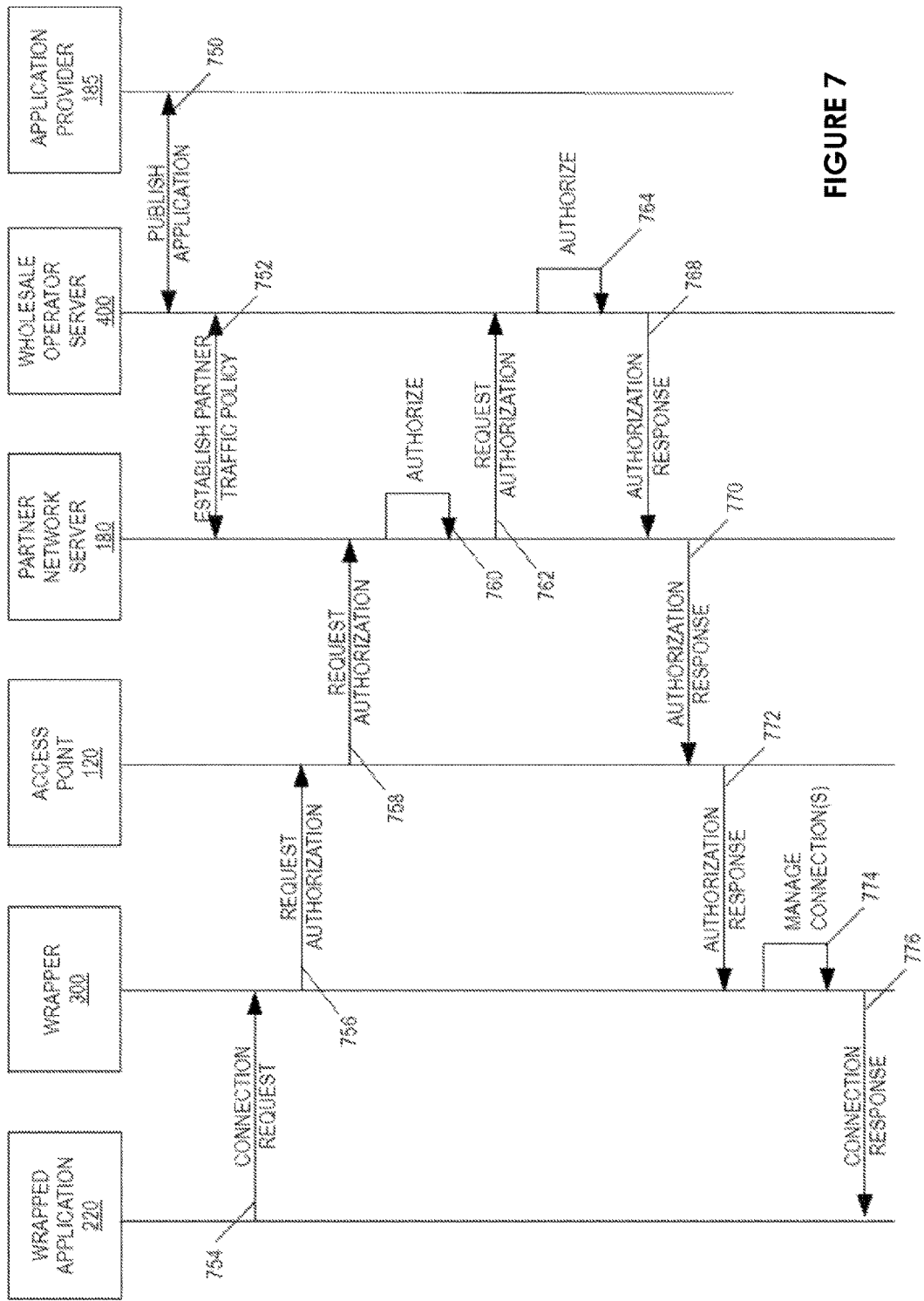
FIG. 7 is a message diagram for obtaining a wholesale data connection from a partner network.

FIG. 7 is a message diagram for obtaining a wholesale data connection from a partner network. The message flow of FIG. 7 shows messages exchanged between several entities which may be included in a communication system.

For ease of explanation, the number of entities shown has been limited. However, it will be understood that additional entities may be added or multiple entities combined consistent with the description herein. The message flow of FIG. 7 illustrates obtaining a wholesale data connection via a network which is controlled by a partner operator who is different than the wholesale operator.

Messaging 750 between the application provider 185 and the wholesale operator server 400 may be performed to publish the application. In one implementation, the application provider 185 may generate a binary application. The application may then be uploaded to the wholesale operator server 400 such as via HTTP, HTTPS, FTP, or other communication protocol. Upon publishing the application, the wholesale operator server 400 may apply a wrapper 300 to the binary provided by the application provider 185. The publication may be to an application store, a website, or other distribution location/mechanism.

As part of the messaging 750, the application provider 185 may also specify a wholesale agreement with the wholesale operator server 400. For example a news application provider may negotiate 10 MB of use per user per day for an application to be provided by the wholesale operator server 400.

One or more messages 752 may be exchanged between the wholesale operator server 400 and the partner network server 180 to establish a partner traffic policy. The partner traffic policy provides criteria to the partner network server 180 to indicate that application traffic for a wrapped application should be permitted without additional subscription. For example the partner traffic policy may include a wholesale operator identifier and an application identifier. These two elements may be used to identify wrapped application communications and provide a zero rating for data connections for the identified application and operator through the partner network server 180.

The wrapped application 220 may transmit a connection request to the wrapper 300 via message 754. The wrapper 300 may transmit a message 756 to the access point 120 including an authorization request for wholesale access for the wrapped application 220. The authorization request may include an application identifier and an identifier for the wholesale operator. In some implementations the authorization request may include additional information such as a device identifier, a location identifier, or a user identifier indicative of a user of the application.

The partner network server 180 via message 760 may attempt to authorize the application and/or device. For example, the partner network server 180 may determine a particular device is included on a blacklist based on the information included in the authorization request and therefore will not authorize the device/application to access their network. The authorization may also include authorizing based on previously obtained authorization information from the wholesale operator server 400. In such an implementation, the partner network server 180 may be configured to store data connectivity policy information for specific application and wholesale operator. The partner may use the stored data connectivity policy information to authorize the connection for the application.

In the message flow shown in FIG. 7, the partner network server 180 via message(s) 760 may perform the initial authorization (e.g., determine the request is not black-listed) to determine the request is authorized for limited purpose of communicating with the wholesale operator server 400. As shown however, the partner network server 180 may transmit a message 762 to the wholesale operator server 400 including the authorization request. The authorization request may be the same as transmitted via message 758. In some implementations, the authorization request included in the message 762 may include additional information such as an identifier of the partner network server 180.

The wholesale operator server 400 via message 764 may perform an authorization. The authorization may be based on the information included in the authorization request received from the partner network server 180. For example, if the application is executed on a device is located within a retail location, wholesale access may be granted free of charge to the device/application. However if the device travels outside the retail location, limited wholesale access may be granted. The limit may be based on quantity of data, time of day, or other factor. The authorization may also consider the partner network server 180 through which the request was sent. For example, the wholesale agreement between the wholesale operator and the application provider 185 may be a value based agreement (e.g., $5.00 of service per user per day). In such an implementation, the cost of access may differ between partners. The partner network identifier may be used to identify a cost basis for access which may be included in the authorization determination.

FIG. 7 shows a message 768 sent from the wholesale operator provider to the partner network server 180 including the authorization response. The authorization response includes an authorization token. The authorization token may be used to identify the authorization determination for the authorization request. The authorization determination may be no wholesale access, partial access, or full access. The authorization response may also include a data connectivity policy as discussed above. The authorization response may include data connectivity policy cache information. The data connectivity policy cache information may indicate whether the data connectivity policy information for the specified application may be cached by the partner network server 180 and, if so, how long. This cached information may be used for subsequent authorization such as message 760 discussed above.

A message 770 sent from the partner network server 180 to the access point 120 includes an authorization response. In some implementations, the authorization response included in message 770 may be the same as the authorization response received in message 768 from the wholesale operator server 400. In some implementations, the authorization response is generated based on the authorization response received in message 768 from the wholesale operator server 400. The authorization response of message 770 includes the authorization token. The authorization token may be used to identify the authorization determination for this application/device. The authorization response may also include a data connectivity policy as discussed above.

The access point 120 may transmit the authorization response via message 772 to the wrapper 300. Based on the authorization response, the wrapper 300 via message 774 may manage the connections. Managing the connections may include establishing the connection, closing the connection, resetting a connection, or the like. In some implementations, the connection manager 304 may be configured to manage the connections. Message 776 is transmitted from the wrapper 300 to the wrapped application 220 indicating the connection response. If authorized, the connection response may include an indication that a wholesale data connection has been established.

Having established a wholesale data connection through the partner operator, the wrapped application 220 may begin using the partner operated connection to send and receive data.

Figure 8:
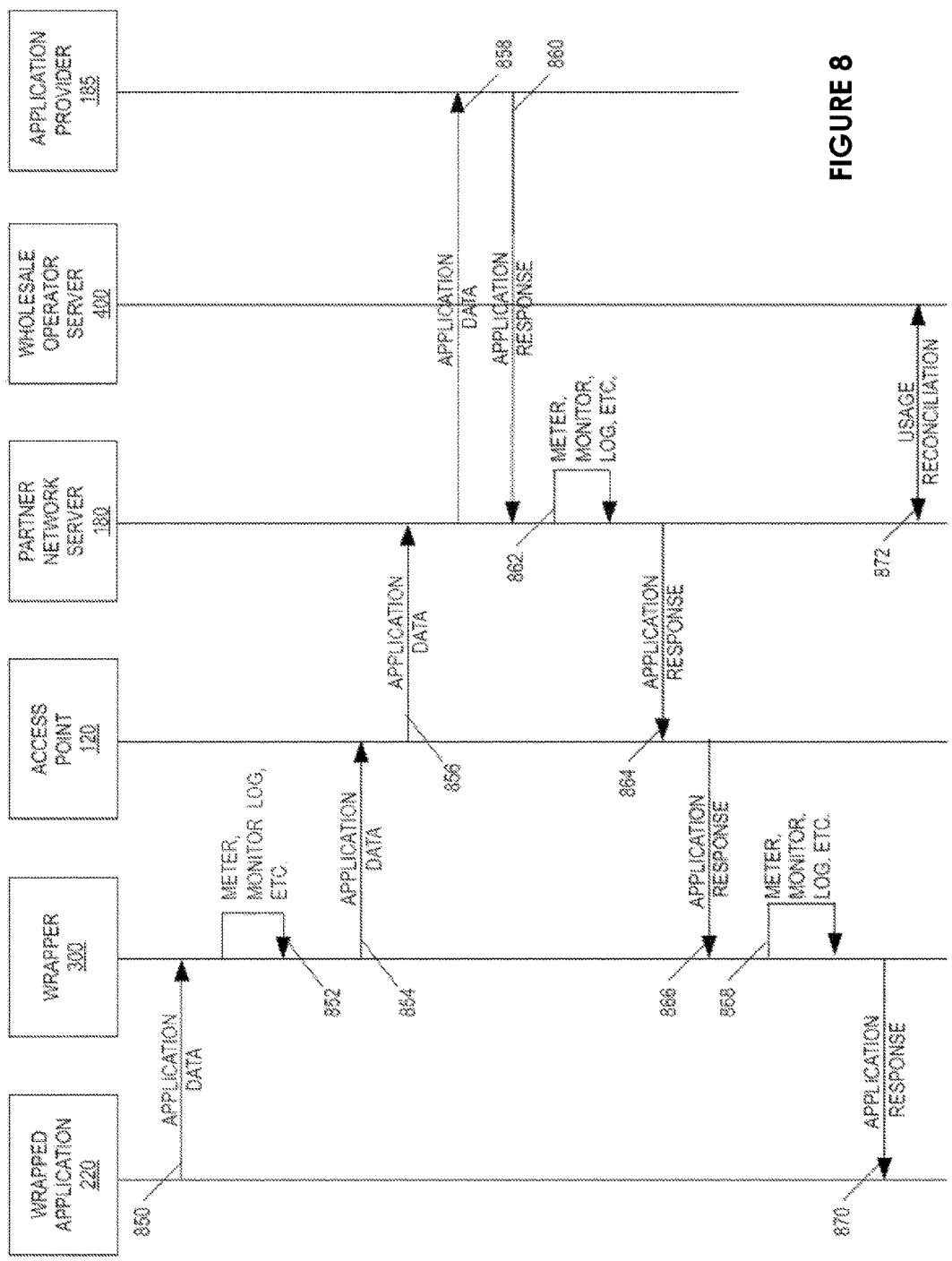
FIG. 8 is a message diagram for transmitting data via a wholesale data connection from a partner network.

FIG. 8 is a message diagram for transmitting data via a wholesale data connection from a partner network. The message flow of FIG. 8 shows messages exchanged between several entities which may be included in a communication system. For ease of explanation, the number of entities shown has been limited. However, it will be understood that additional entities may be added or multiple entities combined consistent with the description herein. The message flow of FIG. 8 illustrates application communication via a wholesale data connection through a network which is not controlled by the wholesale operator (e.g., a partner operator).

A message 850 may include application data. The message 850 may be transmitted from the wrapped application 220 to the wrapper 300.

The wrapper 300 via message 852 may monitor, meter, log, or otherwise process the application data. Presuming the application data does not violate the data connection policy, message 854 is transmitted from the wrapper 300 to the access point 120 including the application data. The access point 120 is configured to transmit the application data to the partner network server 180 via message 856. The application data may include the authorization token to identify the prior connectivity permission granted to the application/device. A validation of the authorization token included in the application data may be performed by the partner operator. If the token is valid (e.g., associated with a previously authorized connection; not expired; etc.), the transmission may be permitted. If the token is not recognized or is expired, the authorization shown in FIG. 7 may be repeated to obtain a new authorization token.

In the case where the application data is authorized, the partner operator transmits the application data to the application provider 185 via message 858. In some implementations, the application data may be transmitted to another service provider (not shown). For example, the application may access content (e.g., multimedia, images, text) hosted by a third-party.

Message 860 includes an application response. The application response shown in FIG. 8 is transmitted from the application provider 185 to the partner operator server 180. The partner operator server 180, at message 862, meters, monitors, logs or otherwise processes the application data and/or response. The partner operator server 180 may seek reimbursement for the data transmitted for the application. Accordingly, the partner operator server 180 may store information related to the application data transmitted and/or received via its network for the application. The information may include a time of transmission, a quantity of data transmitted, a type of data transmitted, the application identifier, a device identifier for the device hosting the application, user information, or other data which can be used to effectively identify the source and/or quantity of data traffic for the application.

Message 864 and message 866 transmit the application response from the partner operator server 180 to the wrapper 300 via the access point 120. The wrapper 300 at message 868 will meter, monitor, log, or otherwise process the application response data. This may include counting the number of bytes received, identifying the content received, logging any errors obtained, and the like. Not shown is the periodic reporting of the usage data to the wholesale operator provider. The report may include an identification of the application, data monitored or logged, errors, wrapped application configuration (e.g., settings, version number), partner operator used for the connection, or other information related to the wrapped application 220.

Assuming the data connectivity policy has not been exceeded, the wrapper 300 may then transmit the application response to the wrapped application 220 via message 870.

Messaging 872 between the partner operator server 180 and the wholesale operator server 400 may be performed to reconcile the usage for the wrapped application 220. As discussed, the partner operator and the wholesale operator may have negotiated terms of access for the application. The terms may include a quantity of data (e.g., per user, per application, for the wholesale operator) or a value of data (e.g., maximum cost). The reconciliation process may include identifying the cost of service provided by the partner operator and generating a request for the amount. The basis for the cost may also be included in the request. The wholesale operator may compare the usage reported by the wrapper 300 with the usage reported by the partner operator. Any discrepancies may be handled through subsequent messaging between the partner operator server 180 and the wholesale operator server 400 or via a manual process. Although not shown in FIG. 8, the billing server 150 may be included in the reconciliation process.

Figure 9:
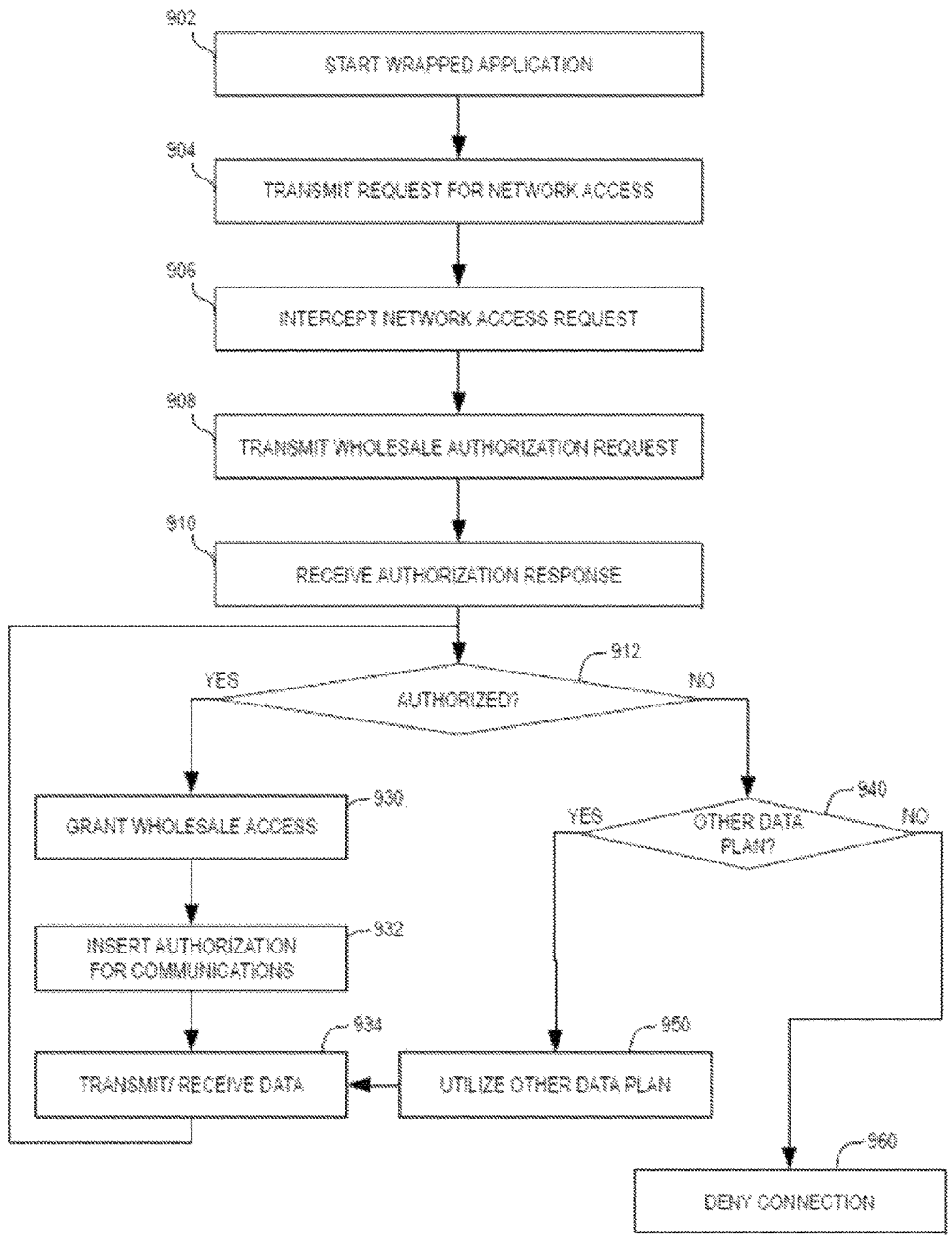
FIG. 9 is a process flow diagram for an example method of data transmission.

FIG. 9 is a process flow diagram for an example method of data transmission. The method shown in FIG. 9 may be implemented via a communication device such as the communication device shown in FIG. 2.

The process begins at block 902 where a wrapped application for the communication device is started. Starting a wrapped application may include, for example, executing the application or attaching a component to the communication device.

At block 904, the wrapped application 220 transmits a request for network access. The request may be seeking data network access. The request may include one or more of the application identifier, a destination address (e.g., IP address, canonical Internet address, SSID, port, protocol, or other destination identifier), and credential information (e.g., security token; digital certificate; etc.). The request may be transmitted via wired and/or wireless means.

At block 906, the network access request is intercepted by the wrapper 300. The wrapper 300 may form a container for communications to and from the application. The container may monitor and control data transmitted by the application and data received for the application. The container may be transparent to the application as well as the device. In some implementations, the container serves as a proxy for communication and other functions between the application and the communication device.

At block 908, the wrapper 300 transmits a wholesale authorization request. The wholesale authorization request may be similar to those discussed above with reference to, for example, FIGS. 5 and 7. The wholesale authorization request may be transmitted via wired and/or wireless means.

At block 910, the wrapper 300 receives an authorization response. The authorization response may be similar to those discussed above with reference to, for example, FIGS. 5 and 7. The authorization response may be received via wired and/or wireless means. The authorization response may be received via different means than used to transmit the wholesale authorization request.

At block 912, a determination is made as to whether the access is authorized. The determination is based on the received authorization response. For example, the authorization response may include a value indicating whether or not the request is authorized. The authorization response may also include an authentication token. The authentication token may be included in subsequent communications to identify the application traffic as an authorized transmission.

If the determination at block 912 is that the access is an authorized wholesale access, the process continues to block 930. At block 930, the wrapper 300 grants wholesale access for the wrapped application 220. Granting wholesale access may include establishing a connection for the application and providing a message indicating such establishment.

At block 932, authorization identification is included in subsequent communications from the wrapped application 220. This may include the authorization token. The authorization identification may be included in a header of the communication. In some implementations, the authorization identification may be included in a data field within the body of the communication (e.g., as part of the application data).

At block 934, the application data including the authorization identification is transmitted and/or received. The transmission of data may also include transmission of the usage information collected by the wrapper 300. The transmission of data can further include transmitting and/or receiving wrapped application configuration information.

Once transmitted, the process returns to block 912 to determine whether the connection remains authorized. The authorization may expire, the authorization limits (e.g., data quantity) may be exceeded, or an event may have occurred causing the authorization to terminate (e.g., powering down, handoff to a Wi-Fi network, handoff to a free network).

If the determination at block 912 is that the wrapped application 220 is not authorized, the process continues to block 940. At block 940, a determination is made as to whether another data access plan is available. As discussed above, the communication device may transition to a wireless network such as a Wi-Fi network in an office. As the device transitions, the need for "free" access may not be necessary as the device may be configured to freely access the Wi-Fi network. If there is another data access plan available, the process continues to block 950 where the alternative plan is utilized for the wrapped application 220. In this situation, the data may be monitored and event information collected. However, the data meter for the wrapped application 220 may be paused as a wholesale connection is no longer needed for the application. Should the device transition back to cellular/LTE access, a reauthorization may occur starting with block 912 as described above.

Returning to block 940 of FIG. 9, should no other data access plan exist for the communication device, the connection request may be denied at block 960. The denial may include transmitting a message to the wrapped application 220 to indicate no data connection is currently available. The wrapped application 220 may be configured to take various actions including returning to block 904 to transmit another request, prompting the user for additional access plan information, prompting a user with the reason for denying the connection (e.g., exceeded amount allocated, moved outside the wholesale geospatial location (e.g., left the store), etc.).

Figure 10:
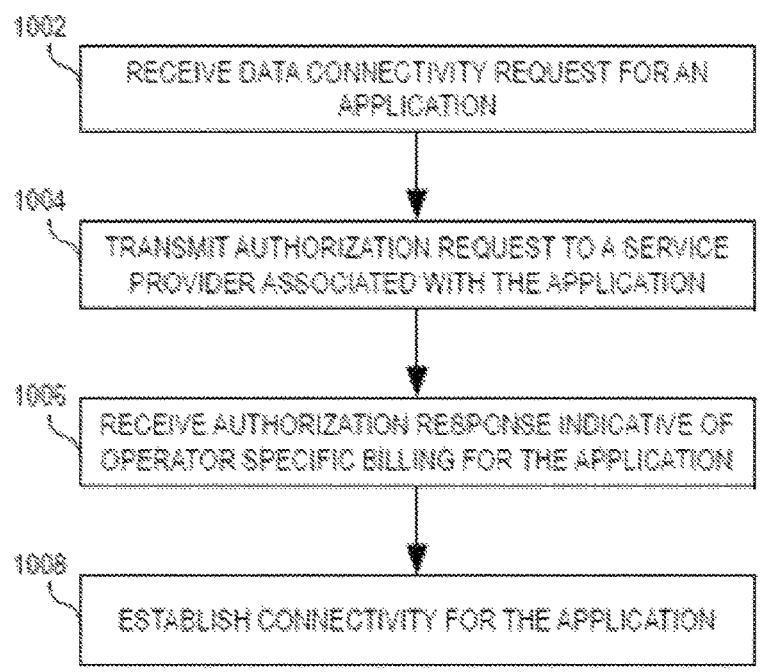
FIG. 10 is a process flow diagram for an example method of establishing data connectivity.

FIG. 10 is a process flow diagram for an example method of establishing data connectivity. The method shown in FIG. 10 may be implemented via a communication device such as the communication device shown in FIG. 2 or the wrapper 300 shown in FIG. 3.

The method begins at block 1002 where a data connectivity request is request is received for an application. The data connectivity request may include an authorization request as described above. The data connectivity request may be received directly from the device requesting connectivity. In some implementations, the request may be received via one or more intermediaries. At block 1004, an authorization request is transmitted to a service provider associated with the application. One example of the service provider is the wholesale operator. At block 1006, an authorization response is received from the service provider. The authorization response is indicative of operator specific billing for the application. At block 1008, the connectivity is established for the application based on the authorization response.

Figure 11A:
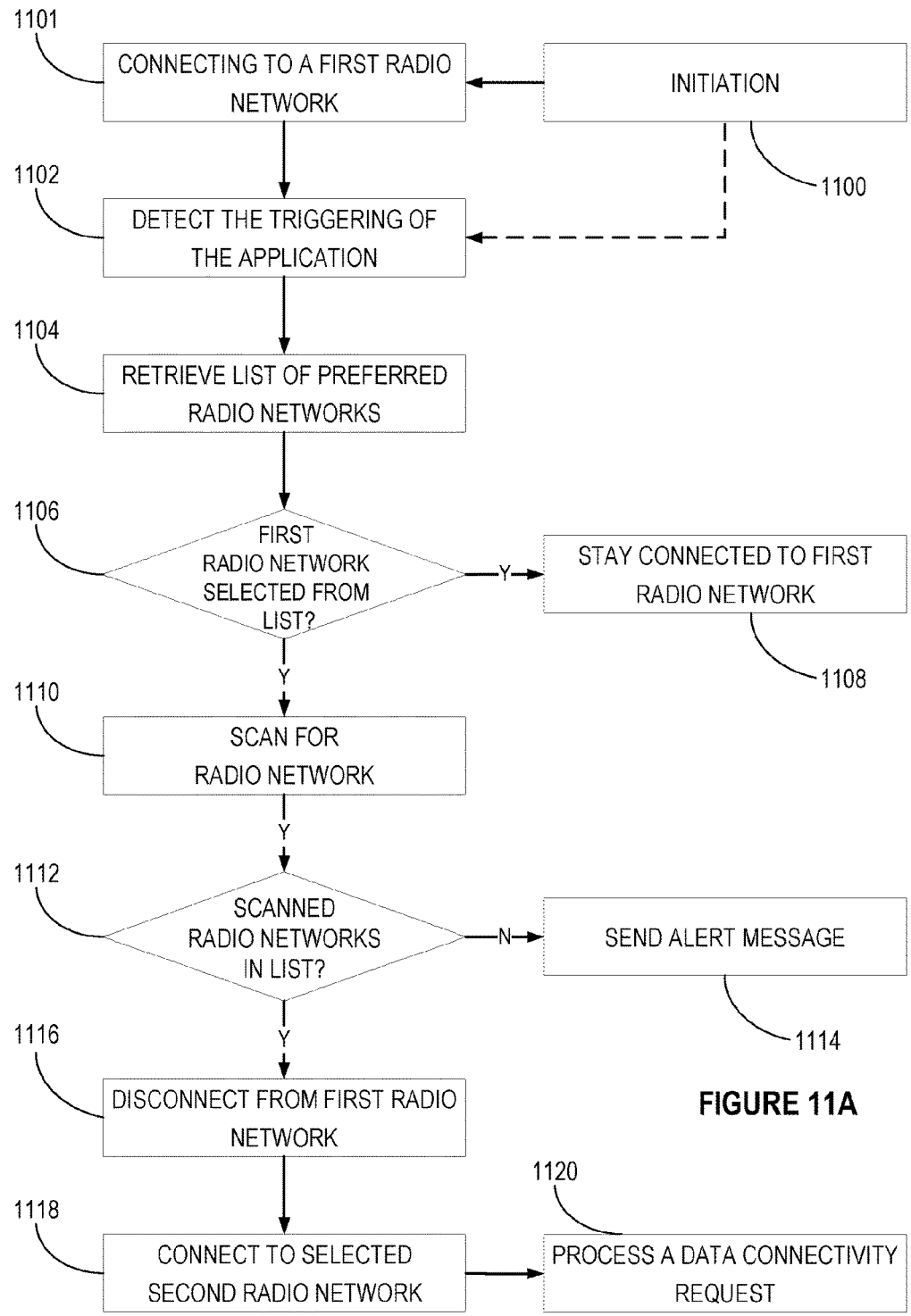
FIGS. 11A and 11B are process flow diagrams for an example method of selecting a radio network.
Figure 11B:
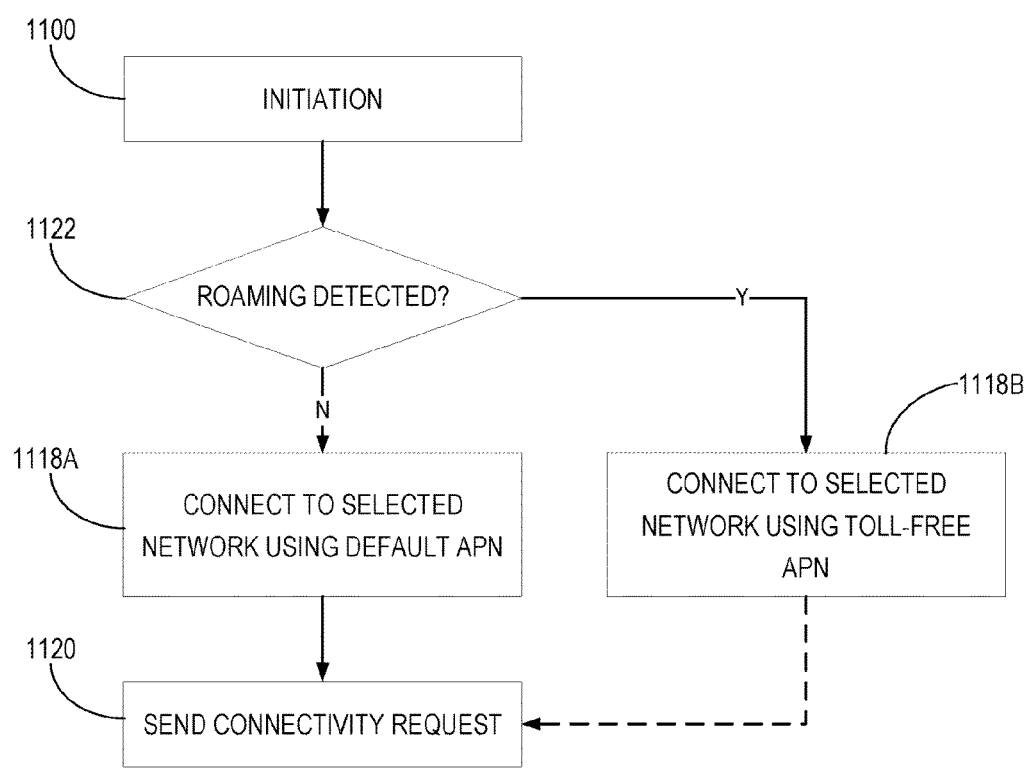

FIGS. 11A and 11B are process flow diagrams illustrating an example method for selecting a radio network. The method will be illustrated in the context of wrapped application 220 running on a communication device 200. The present method may be carried out by the processor of the device using the different modules of the communication device 200 and the wrapper 300 described before.

FIG. 11A illustrates the present method when a roaming situation is not taken into account. At initial block 1100, the process is initialized. This may corresponds to the powering of the communication device 200. The process will proceed at block 1101 with the communication device 200 registering—or connecting—with a first radio network. This may be carried out by the network manager 230 after scanning for available networks and selecting one available network pertaining to the list of operator preferred networks. The radio network may be the home network if the communication device is a mobile device registered with a mobile network like a 3G, 4G, LTE, GPRS (and the likes) type of network. The radio network may also be a visited network, causing the mobile device 200 to roam outside its home network. The radio network may also be a WiFi network like the ones offered by a hotspot or a home gateway. In the present method, the wrapped application is associated to a list of application preferred networks that may be obtained by the configuration manager 308 of the wrapper 300, as explained before.

Alternatively at block 1100, the initiation may correspond to going into flight mode, i.e. preventing the communication device to connect to a network. This may correspond also to turning off the data connection in roaming situation, limiting the communication device to calls and textingz. This may be needed when the user of the device is in a foreign country and knows he will be in a roaming situation. The process will then move directly on to block 1102 as seen from the dotted lines in FIG. 11A.

At block 1102, the event processor 320 detects the triggering of the wrapped application by the user and reports it to the connection manager 304. At block 1104, the connection manager 304 will retrieve from the configuration manager 308 the list of preferred networks for the application that was just triggered. This may be achieved through an application identifier if the configuration manager is e.g. common to several applications.

Subsequently, the connection manager 304 will connect through blocks 1106 to 1118 with a radio network based on, i.e. selected from the retrieved list of preferred radio networks. This may include staying with the current network or registering with a newly selected network from the list of application preferred networks. Different selection algorithms may be available at this stage if several networks in the list are within range of the communication device. Such algorithms are beyond the scope of the present application. The connection manager 304 may only select networks that are both in the list of application preferred networks and the list of operator preferred networks.

The connection may proceed as follows. At block 1106, the connection manager 304 will check if the current radio network for the communication device 200 (if connected), i.e. the first radio network, may be selected from the retrieved list of preferred networks. Provided it may (Yes to block 1106), the connection manager 304 will maintain the device connection with that current radio network at block 1108. Provided it may not (No at block 1106), the connection manager 304 will request the network manager 230 to scan for available networks at block 1110.

In a subsequent block 1112, the connection manager 304 will receive the list of available networks from the configuration manager 308 and determine if there is any available network that pertains to the list of application preferred networks. Provided none can be found in the preferred networks (No at block 1112), the connection manager 304 may be configured to send to the user through e.g. the mobile device an alert message reporting that no available network corresponds to the list of preferred radio networks.

Provided at least one available network may be found in the list of preferred networks (Yes at block 1112), the connection manager 304 will proceed with selecting one preferred network matching the available networks, using different selection mechanisms (no shown in FIG. 11) and carry on with requesting the network manager 230 to disconnect from the first radio network at block 1116. This is needed when the communication device 200 is already connected to the first radio network prior to the triggering of the application. Provided it was not connected yet (e.g. flight mode or data connectivity off as mentioned before), the communication device will simply skip block 1116 and proceed with block 1118.

At a subsequent block 1118, the connection manager 304 will instruct the network manager to attach to the selected available network, as a second radio network. The attachment will comprise an authentication with the network to determine if the communication device is allowed to communicate and exchange data over the second radio network. The user may be prompted at this level to confirm the change of network attachment or simply to allow attaching to a new network, or opening the data connection (on top of the voice and text connection that may already be open).

Once attached to the second radio network, the connection manager 304 may process a connectivity request over the radio network, as described in conjunction with FIGS. 5 to 10. One may note that the second radio network may be a partner radio network from the list of operator preferred networks as the device may not be allowed to attach to networks that do not correspond to a network partner to the network operator the communication device is a subscriber of.

Based on the present application based network selection, a communication device 200 may be currently registered in its home network SuperTelco. Nonetheless, provided it is within reach, the triggering of the application like MegaSports may cause the communication device 200 to connect, i.e. roam into the partner network OtherTelco as the network specific billing are available only in that network. Provided the application is a streaming type of application, consuming large amounts of data, it becomes interesting for the user of the communication device 200 to change registration and opt for a network where the data activities linked to the streaming may be discounted or even toll-free.

A problem may arise though when some networks in the list of preferred networks for the wrapped application are mobile networks (3G, 4G, LTE, GPRS . . . ). Indeed, switching from a first radio network to a mobile network (as the selected second radio network) will allow data activities from various applications over the mobile network. This may not be desirable, as only the wrapped applications prepaid with the mobile network, here in the role of the partner network, will be toll-free. Other applications, even without the user's knowledge, may still use the open data connection, with roaming charges.

As mentioned before, when connecting to a mobile network, an APN is provided in the registration request from the communication device, presently a mobile device. A mobile network is always associated to a default APN for any data activity with a content source available for instance over the Internet. In the present system, when the selected network is a mobile network, i.e. the selected network is associated with a default APN, the connection manager 304 is further arranged to connect to the mobile network, when selected, using its default access point name.

In the present system, each mobile network e.g. part of a whole sale agreement is also provided with a dedicated or toll-free APN. That APN is configured to filter data activities that do not correspond to prepaid applications. To do so, in each mobile network, the APN stores information shared from, i.e. synched with the wholesale agreement database, like prepaid application identifiers, partner networks identifiers . . . i.e. any information that allows the APN to identify data traffic related to prepaid applications from data traffic related to other applications. The former will be allowed access to the internet and content sources it is destined to, while the later will be blocked to avoid any unwanted roaming charges to the user. The toll-free APN is associated to the application through the configuration manager 308 of the wrapper 300. In other words, FIG. 11B is an illustration of the impact of roaming in the network selection when taken into account. Subsequent to the initiation block 1100, the event detector is further configured to detect if the communication device is currently roaming. When connected to a first radio network as in block 1101 of FIG. 11A, this may simply be done by the registration with a mobile network distinct from the mobile device home network. This may also be detected using the mobile device location.

Alternatively, when the user has turned off the network connections (e.g. flight mode), roaming may be determined through the location of the device. Roaming will be checked at block 1122. Block 1122 may be carried out by the event processor 320 either after triggering of the application or after connection to the first radio network at block 1101. Provided no roaming is detected (No to block 1122), the connection of block 1118 mentioned before, block 1118A in FIG. 11B, will be carried out with the default APN.

Provided a roaming is detected (Yes to block 1122), as the traffic needs to be routed through the dedicated APN for filtering, the connection of block 1118 to the mobile network, block 1118B in FIG. 11B, will be carried out using the dedicated, i.e. second APN instead of the default APN. That substitution is carried out by the connection manager 304 if the application is determined to be (i.e. tagged as) toll-free, i.e. associated to operator specific billing (conditions). The process will carry on at block 1120 with the sending of the application connectivity request. The applications that are determined to be toll-free or prepaid may be seen as "white listed", i.e. applications that are to be managed using operator specific billing conditions. As mentioned before, they are identified in wholesale agreements between a wholesale network operator and the application provider. A communication device subscriber of the wholesale network operator may enjoy the toll-free application(s) when attached to its home network, as well as when visiting networks partner to the wholesale agreement. Subscribers of these partner networks may also enjoy the same services for the same applications.

The present system was illustrated using wrapped application enabling toll-free data connections. The here in teaching may be applied to other applications provided with a list of preferred networks to exchange data activities with. Furthermore, when it comes to prepaid applications, a wrapper is a possible embodiment of the present system. The different units and modules required to enable an application based selection of a network may be regrouped in an agent at the communication device level. For instance, the configuration manager, the connection manager, the event processor . . . may be part of the same agent for instance provided to the communication device. The connection manager 304 and network manager 230 may even be one of the same. Such an agent would then managed directly the authorization of an application data connectivity request, using an application configuration file provided for each application on the device that can be prepaid.

The teaching of the present method may be extended to an electronic device running several applications simultaneously. In other words, the network selection may be based on the application running in the foreground. In an additional embodiment of the present method, there is provided a second application executable on the communication device, the second application being associated to a second list of preferred radio networks. The event detector of each wrapped application may be configured to determine if the wrapped application is running in the foreground. The connection manager of the wrapped application running in the foreground is then operable to attach to a radio network from the list of preferred radio networks associated to the application running in the foreground. When the present system is implemented through a single agent, an event detector equivalent to the event detector of a wrapped application is operable to detect which application is running in the foreground. The connection manager module of the agent is further operable to attach to a radio network from the list of preferred radio networks associated to the application running in the foreground.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An electronic device for providing data connectivity, the device comprising:
   an application associated with a list of application-preferred radio networks,
   a connection manager configured to detect and connect the electronic device with a radio network, and
   an event processor configured to detect a triggering of the application,
   the connection manager being further configured, when the event processor reports the triggering of the application, to:
   retrieve the list of application-preferred radio networks associated with the application,
   connect with an available radio network selected from the retrieved list of application-preferred radio networks using a selection mechanism,
   process a data connectivity request from the application over the selected available radio network, and
   wherein the connection manager is further arranged, prior to connecting with the available radio network selected from the retrieved list of application-preferred radio networks, to scan for available radio networks.

2. The electronic device according to claim 1, the device being already connected with a first radio network prior to the triggering of the application, wherein the connection manager is further arranged to stay connected with the first radio network when the first radio network belongs to the list of application-preferred radio networks.

3. The electronic device according to claim 2, the connection manager being further arranged, prior to connecting with a second radio network selected from the list of application-preferred radio networks, to disconnect from the first radio network.

4. The electronic device according to claim 1, wherein the connection manager is further arranged to send an alert message when no available radio network corresponds to the list of application-preferred radio networks.

5. The electronic device according to claim 1, wherein the application is associated with the list of application-preferred radio networks in an application configuration file, the connection manager being configured to use the configuration file to connect with the selected available radio network.

6. The electronic device according to claim 1, wherein a radio network of the list of application-preferred radio networks is associated to a default access point name, the connection manager being further arranged to connect to said radio network, if selected, using the default access point name.

7. The electronic device according to claim 6, said radio network being further associated to a second access point name, wherein the event detector is further configured to:
   detect a roaming situation,
   the connection manager being further configured, when the event detector reports a roaming situation, to use the second access point name in place of the default access point name, if the application is tagged with operator specific billing.

8. The electronic device according to claim 1, the device comprising a second application, the second application being associated with a second list of application-preferred radio networks, the event detector being configured to detect which among the application and the second application is running in the foreground of the electronic device, the connection manager being further configured to connect to an available radio network from the list of application-preferred radio networks associated with the application running in the foreground.

9. The electronic device of claim 1, wherein the application-preferred radio networks comprises networks of operators partnering with a provider of the application.

10. A method for providing data connectivity to an application running on an electronic device, the application being associated with a list of application-preferred radio networks, the method comprising:
    detecting and connecting the electronic device with a radio network,
    detecting a triggering of the application,
    when the triggering of the application is detected:
    retrieving the list of application-preferred radio networks associated with the application,
    connecting with an available radio network selected from the retrieved list of application-preferred radio networks using a selection mechanism, and
    processing a data connectivity request from the application over the selected available radio network, and
    wherein the method further comprises a connection manager of the electronic device scanning for available radio networks, prior to connecting with the available radio network selected from the retrieved list of application-preferred radio networks.

11. The method of claim 10, wherein the application-preferred radio networks comprises networks of operators partnering with a provider of the application.

12. The method of claim 10, wherein a second application associated with a second list of application-preferred radio networks is running on the electronic device, the method further comprising:
    detecting which among the application and the second application is running in the foreground of the electronic device; and
    connecting to an available radio network selected from the list of application-preferred radio networks or from the second list of application-preferred radio networks depending on which application is running in the foreground of the electronic device.

13. The method of claim 10, wherein a radio network of the list of application-preferred radio networks is associated to a default access point name, the method further comprising connecting to said radio network, if selected, using the default access point name.

14. The method of claim 13, wherein said radio network is further associated with a second access point name, the method further comprising:

detecting a roaming situation; and when the roaming situation is detected, using the second access point name instead of the default access point name, if the application is tagged with operator specific billing.

15. A non-transitory computer-readable storage medium comprising instructions executable by a processor of an apparatus, the instructions causing the apparatus to:

detect and connect a device with a radio network, detect a triggering of an application running on the apparatus, the application being associated with a list of application-preferred radio networks, when the triggering of the application is detected:

retrieve the list of application-preferred radio networks associated with the application, connect with an available radio network selected from the retrieved list of application-preferred radio networks using a selection mechanism, process a data connectivity request from the application over the selected available radio network, and wherein the instructions cause a connection manager of the apparatus to, prior to connecting with the available radio network selected from the retrieved list of application-preferred radio networks, scan for available radio networks.

16. The non-transitory computer-readable storage medium of claim 15, wherein the application-preferred radio networks comprises networks of operators partnering with a provider of the application.

17. The non-transitory computer-readable storage medium of claim 15, wherein a second application associated with a second list of application-preferred radio networks is running on the apparatus, and wherein the instructions further cause the apparatus to:

detect which among the application and the second application is running in the foreground of the electronic device; and connecting to an available radio network selected from the list of application-preferred radio networks or from the second list of application-preferred radio networks depending on which application is running in the foreground of the electronic device.

18. The non-transitory computer-readable storage medium of claim 15, wherein a radio network of the list of application-preferred radio networks is associated to a default access point name, and wherein the instructions further cause the apparatus to connect to said radio network, if selected, using the default access point name.

* * * * *